(12) United States Patent
Learmonth et al.

(10) Patent No.: US 9,798,903 B2
(45) Date of Patent: Oct. 24, 2017

(54) LABELING AND AUTHENTICATING USING A MICROTAG

(71) Applicant: TruTag Technologies, Inc., Kapolei, HI (US)

(72) Inventors: Timothy Learmonth, Berkeley, CA (US); Ting Zhou, Orinda, CA (US)

(73) Assignee: TruTag Technologies, Inc., Kapolei, HI (US)

( * ) Notice: Subject to any disclaimer, the term of this patent is extended or adjusted under 35 U.S.C. 154(b) by 0 days.

(21) Appl. No.: 15/298,126

(22) Filed: Oct. 19, 2016

(65) Prior Publication Data

US 2017/0039400 A1    Feb. 9, 2017

Related U.S. Application Data

(63) Continuation of application No. 14/979,119, filed on Dec. 22, 2015, now Pat. No. 9,501,670, which is a continuation of application No. 14/451,284, filed on Aug. 4, 2014, now Pat. No. 9,251,452, which is a continuation of application No. 14/103,557, filed on Dec. 11, 2013, now Pat. No. 8,833,656, which is a continuation of application No. 13/918,729, filed on Jun. 14, 2013, now Pat. No. 8,636,213, which is a continuation of application No. 12/966,901, filed on Dec. 13, 2010, now Pat. No. 8,511,557.

(60) Provisional application No. 61/288,289, filed on Dec. 19, 2009.

(51) Int. Cl.
| | |
|---|---|
| G06K 5/00 | (2006.01) |
| G06K 19/06 | (2006.01) |
| G06K 7/14 | (2006.01) |

(52) U.S. Cl.
CPC ............... *G06K 5/00* (2013.01); *G06K 7/14* (2013.01); *G06K 7/1408* (2013.01); *G06K 7/1417* (2013.01); *G06K 19/06* (2013.01); *G06K 19/06037* (2013.01); *G06K 19/06075* (2013.01); *G06K 19/06159* (2013.01)

(58) Field of Classification Search
None
See application file for complete search history.

(56) References Cited

U.S. PATENT DOCUMENTS

2006/0255008 A1* 11/2006 Link ............... B29D 11/00663
 216/2
2007/0148695 A1*  6/2007 Sailor .................. B01J 19/0046
 435/7.1

* cited by examiner

*Primary Examiner* — Kristy A Haupt
(74) *Attorney, Agent, or Firm* — Van Pelt, Yi & James LLP

(57) ABSTRACT

An identifier made using a silicon film. The silicon film has a varying optical index of refraction. The varying optical index of refraction reflects one or more spectral peaks when illuminated with light. The one or more spectral peaks includes a reference peak. The silicon film is fragmented and then oxidized.

14 Claims, 16 Drawing Sheets

LABELING AND AUTHENTICATING USING A MICROTAG

CROSS REFERENCE TO OTHER APPLICATIONS

This application is a continuation of co-pending U.S. patent application Ser. No. 14/979,119, entitled LABELING AND AUTHENTICATING USING A MICROTAG filed Dec. 22, 2015 which is incorporated herein by reference for all purposes, which is a continuation of U.S. patent application Ser. No. 14/451,284, entitled LABELING AND AUTHENTICATING USING A MICROTAG filed Aug. 4, 2014, now U.S. Pat. No. 9,251,452, which is incorporated herein by reference for all purposes, which is a continuation of U.S. patent application Ser. No. 14/103,557, now U.S. Pat. No. 8,833,656, entitled LABELING AND AUTHENTICATING USING A MICROTAG filed Dec. 11, 2013 which is incorporated herein by reference for all purposes, which is a continuation of U.S. patent application Ser. No. 13/918,729, now U.S. Pat. No. 8,636,213, entitled LABELING AND AUTHENTICATING USING A MICROTAG filed Jun. 14, 2013 which is incorporated herein by reference for all purposes, which is a continuation of U.S. patent application Ser. No. 12/966,901, now U.S. Pat. No. 8,511,557, entitled LABELING AND AUTHENTICATING USING A MICROTAG filed Dec. 13, 2010 which is incorporated herein by reference for all purposes, which claims priority to U.S. Provisional Application No. 61/288,289, entitled METHOD AND SYSTEM FOR STORING AND RETRIEVING INFORMATION USING RUGATE MICROTAGS filed Dec. 19, 2009 which is incorporated herein by reference for all purposes.

BACKGROUND OF THE INVENTION

Porous silicon microtags have the advantage of being able to label products. The microtags have an additional advantage in that they are difficult to reproduce and read without specialized equipment. However, to date, the tags have not been able to store sufficient information for some labeling tasks due to complexities (e.g., sidelobes) in the optically read spectrum.

BRIEF DESCRIPTION OF THE DRAWINGS

Various embodiments of the invention are disclosed in the following detailed description and the accompanying drawings.

DETAILED DESCRIPTION

Figure 1A:
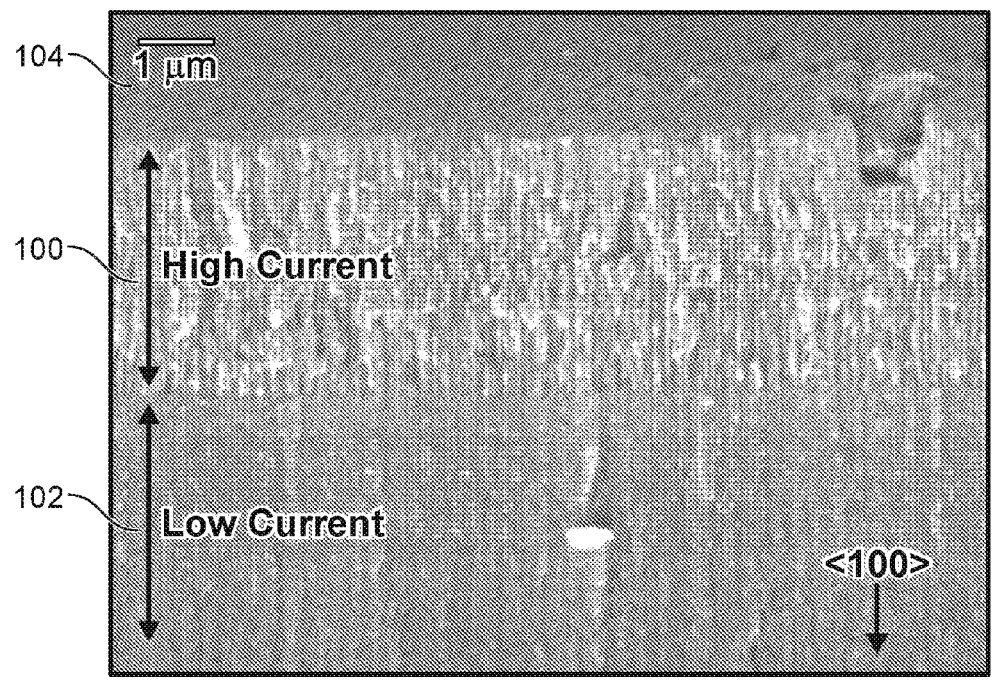
FIG. 1A is a SEM image illustrating an embodiment of a silicon film.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for encoding energy peaks of an identifier comprises an encoder. The encoder is configured to define a readable spectral range of an identifier. The identifier comprises a rugate microtag. The encoder is configured to divide the readable spectral range into a plurality of bins. The encoder is configured to encode in a center of a bin near one end of the readable spectral range a reference peak. The encoder is configured to encode in a center of each of a set of bins a set of peaks of a data pattern within the readable spectral range.

A system for decoding energy peaks of an identifier comprises a decoder. The decoder is configured to receive a reference peak associated with an identifier. The identifier comprises a rugate microtag. The decoder is configured to receive a set of data pattern peak positions associated with the identifier. The decoder is configured to determine a farthest peak of the set of data pattern peak positions from the reference peak position. The decoder is configured to determine a set of data pattern peak bins from the set of data pattern peak positions. The set of data pattern peak bins are based at least in part on a lowest error for a set of potential data patter peak bins corresponding to the set of data pattern peak positions for a potential bin position for the farthest peak.

A system for producing an identifier comprises a processor and an etcher. The processor is configured to determine an identifying data value. The etcher for producing an identifier. The identifier comprises a rugate phase tag. The identifier is identified using the identifying data value. The rugate phase tag encodes the identifying data value at least in part using a calculated rugate phase information. In some embodiments, the rugate phase tag comprises oxidized etched silicon.

A system for reading an identifier comprises a reader and a processor. The reader for reading an identifying data value of an identifier. The identifier comprises a rugate phase tag. The rugate phase tag encodes the identifying data value at least in part using a calculated rugate phase information. The processor is configured to determine an identifying data value.

Porous silicon films have been shown to exhibit spectral properties dependent on thickness, porosity, and pore diameter. The pores are produced by means of an electrochemical etching wherein the etching current density determines the porosity, which is the volumetric fraction of the pores inside a layer of film, and in the case of rugate filters, the etching current waveform determines spectral reflectance peaks. The film's porosity relates directly to the material's optical index of refraction. More porosity leads to a lower refractive index because the dielectric effective medium contains more air.

Spectral peaks, useful for encoding information, can be created and controlled through alternating layers of fixed or varying porosity, such as a Bragg structure, through a single layer of continuously varying porosity, as in a rugate filter, or through various combinations thereof. A rugate is a gradient-index interference filter with a sine-wave refractive index profile.

The spectral properties can be observed by analyzing reflected or transmitted light either from, or through, these films, respectively called "reflectance spectra" and "transmission spectra". Using a light source of multiple wavelengths, spectroscopic analysis can reveal spectral structure in both the reflected or transmitted light, wherein both the wavelength and the amplitude or intensity of the spectral peaks contains encoded information. The encoded information can be useful for means of labeling or authenticating various products or objects when the films, or pieces thereof, are attached to, or embedded within a product, object, or other item.

The films can be broken into small pieces, or tags, ranging from hundreds of nanometers to hundreds of micrometers or more in size. Film thicknesses can range from a few micrometers to hundreds of micrometers or more. Further, the integrity and strength of the spectral structure can be enhanced by oxidizing these films, thus forming optically clear silicon dioxide, also known as silica. A porous silica film, aka "optical film", can be diced, or otherwise fragmented, to create "optical microtags", or simply "tags". In various embodiments, the silicon film is fragmented, then oxidized into silica, oxidized and then fragmented, or any other appropriate sequence of steps to produce a rugate microtag. Porous silica microtags have been shown to exhibit the same spectral properties of their parent film without losing any of the properties or benefits of the parent. These spectral properties include features, such as peaks, that are determined by the various porosities of the film or film layers.

The following focuses on rugate filters of porous silicon, and porous silica, interchangeably called herein "nanoporous optical filters", or "nanoporous filters", or preferably "rugate microtags" (singularly, "rugate microtag"), wherein each rugate spectral peak in the reflectance spectrum of a rugate microtag (each spectral peak that corresponds to a sinusoidal oscillation along the depth of the microtag refractive index is a "rugate peak") can be attributed to a different sinusoidal component of the electrochemical etching waveform. It will be obvious to those skilled in the art that the following can be extended by modification of the formulas herein to layered, Bragg-like film and microtag designs.

Silicon wafers are processed into thin, porous, silicon films with a controllable density of embedded pores ("rugate films"). This process allows the control of the optical properties of silicon films, which carry over into the optical properties of the silica films obtained through oxidation. Silica films produced using this technique can be made into small tags (i.e., rugate microtags) that carry information encoded in the form of their particular optical spectrum. In some embodiments, silicon is etched and then fragmented and then oxidized. A particular optical spectrum, whether reflective or transmissive, can be characterized by distinguishable traits such as peak shape, number, position, or amplitude. The collection of unique traits for a particular spectrum constitutes its "state". We use the term 'state' as used in information theory. In information theory, if the number of states were to double, an additional bit would be necessary to uniquely label each state. Unlike a typical logic gate, which has only two voltage states (high and low), and thus is capable of storing at most one bit, traits in rugate microtags, such as peak shape, number, position, or amplitude, can have more than two values, and each unique set of values of the different traits constitutes a discrete state.

FIG. 1A is a SEM image illustrating an embodiment of a silicon film. In the example shown, the scanning electron microscope (SEM) image shows a cross section of a porous nanostructure of a porous silicon film. Pore diameter in region 100 is larger than in region 102. Scale bar 104 indicates a 1 µm length scale for the SEM image. The pore size is controlled by the current applied during etching. In this sample, the current was decreased suddenly during preparation, resulting in the abrupt decrease in pore diameter observed between region 100 and region 102. The porous silicon film was made by acid-etching a silicon wafer in the presence of an electric current. The etching process creates small pores or cavities in the wafer, the dimensions of which are controlled by the current density of the etching current waveform. The dimensions that are controlled include the depth of pores etched in the silicon film and the diameter and density of the pores; size and density modulation is achieved by controlling electric current density with time. Although the sizes of the pores vary, over a wide range of current densities, the pore size is much smaller than the wavelength of optical light. As a result, the optical properties of the porous silicon, as measured by an incident optical photon, is akin to an average of the silicon and air present within the porous silicon over a distance comparable to the wavelength of the photon. By modulating the pore density as a function of film depth, the index of refraction of a porous silicon film is similarly modulated between that of pure silicon and air. After etching, the film is completely oxidized into silica, resulting in a thin film with a controlled index of refraction (n) as a function of depth between that of silica (n~1.5) and air (n=1). These films meet the requirements listed above for a means to encode information in the optical reflectivity spectrum of a silica tag, i.e., for a means to create a rugate microtag.

Figure 1B:
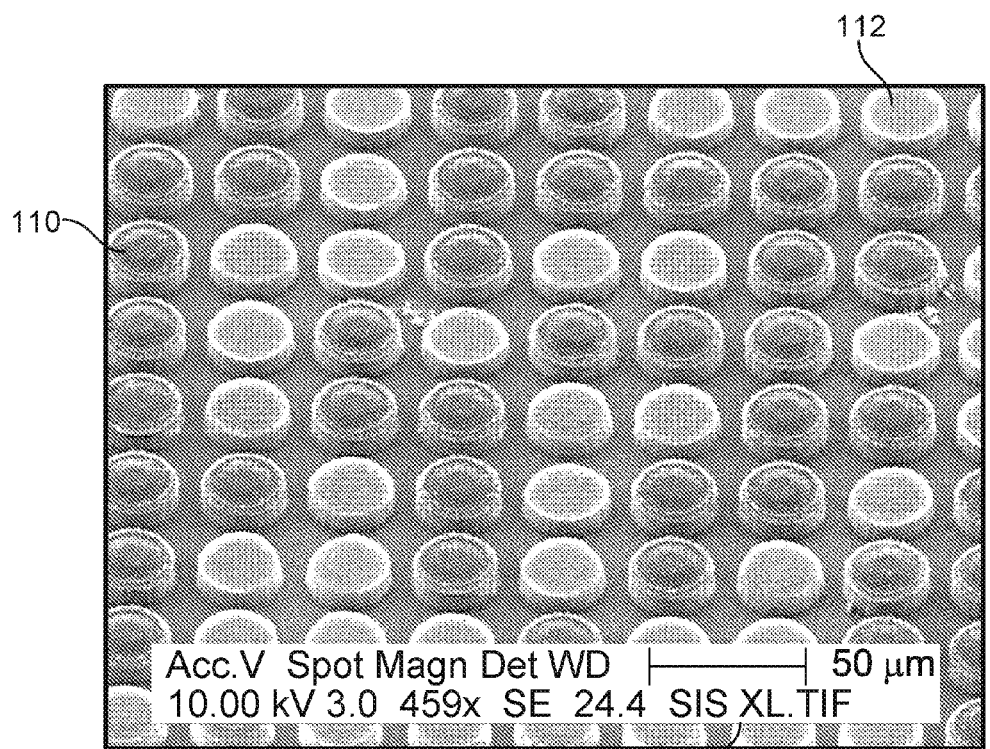
FIG. 1B is a SEM image illustrating an example of porous silicon columns in one embodiment.

FIG. 1B is a SEM image illustrating an example of porous silicon columns in one embodiment. In the example shown, porous silicon columns (e.g., column 110 and column 112) are produced by lithographic patterning and etching. The image shows a 2-dimensional array of porous silicon columns that are approximately 25 microns in diameter and 10 microns in height. Scale bar 114 indicates a 50 µm length scale for the SEM image. The columns are lifted off the substrate with a current pulse to create rugate microtags.

Figure 2:
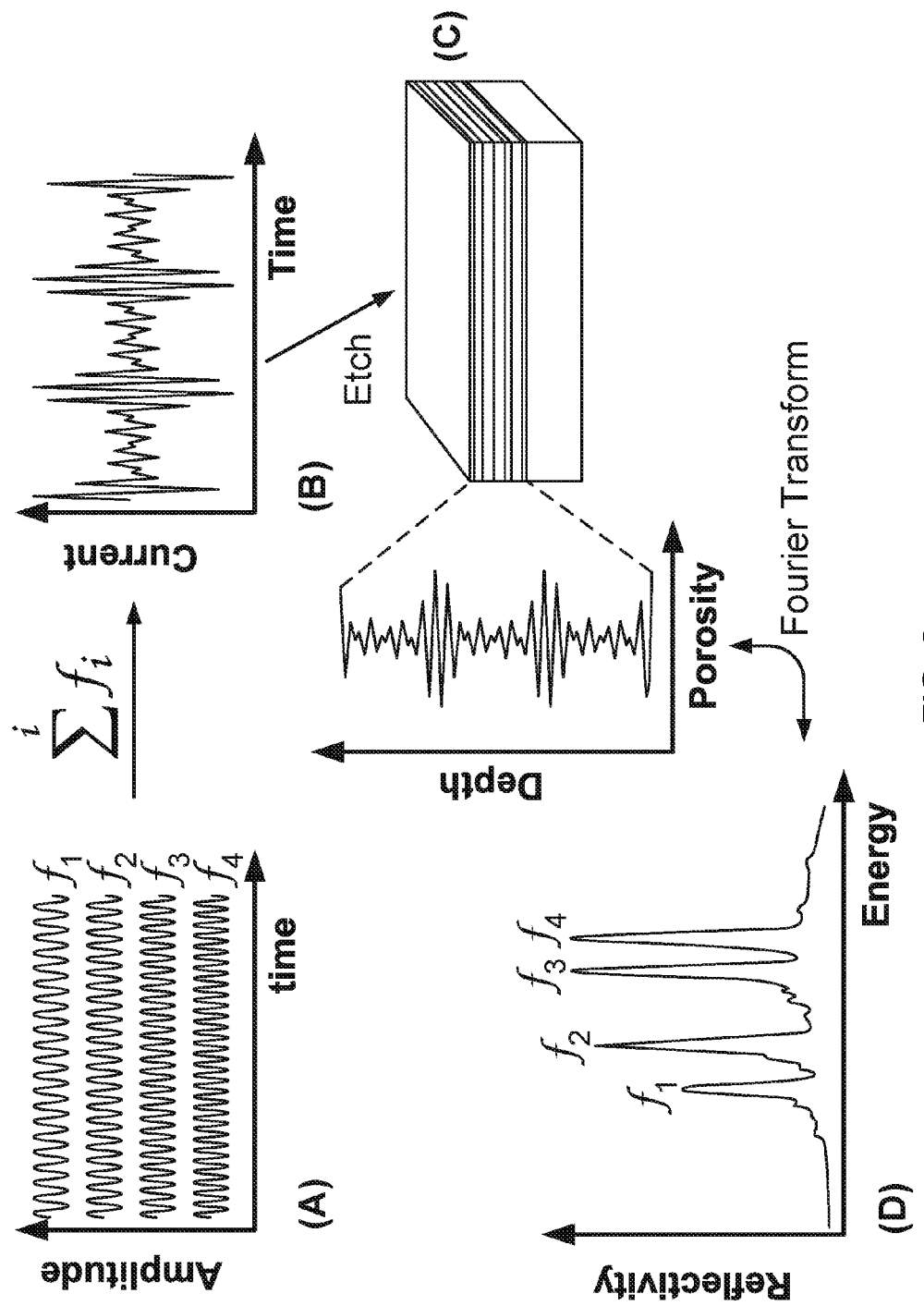
FIG. 2 are a block diagram illustrating an embodiment of a process for creating a rugate microtag.

FIG. 2 are a block diagram illustrating an embodiment of a process for creating a rugate microtag. In the example shown, a waveform superposition method is used to design a spectral state. Four sine waves with different frequencies (A—shows sine waves of four frequencies, f1, f2, f3, and f4, with equal amplitudes as a function of time) are added together to generate a composite waveform (B—shows the sum of the four waves and indicates that this will control current as a function of time) that is then converted into a current-time waveform by the computer-controlled current source. This current-time waveform etches a porosity-depth profile into the Si wafer (C—shows an etched silicon wafer with a porosity as a function of depth graph). Analogous to a Fourier transform of the composite waveform, the resulting optical reflectivity spectrum (D—an optical reflectivity spectrum showing energy as a function of frequency) displays the four frequency components of the original four sine waves as separate spectral peaks. The position and intensity of each rugate spectral peak is influenced by the frequency and amplitude, respectively, of its corresponding sine component. Note that the overall spectral shape of the illuminating light source, as well as the bandwidth of the optical components and spectrometer used to measure the reflected or transmitted rugate spectra, also influence the measured reflectivity peak amplitudes. Further, note that increasing the frequency of a given sine component not only increases the energy (or peak position) of a corresponding reflectivity peak, but also results in an increased amplitude of each peak, absent any competing effects from the measuring system. Increasing the amplitude of a given sine component results in an increased amplitude of each spectral peak without affecting its energy (or peak position), absent any competing effects from the measuring system. With a rugate filter, the continuous variation of the refractive index of a material as a function of depth is used to create peaks of strong reflectivity at only specific wavelengths, and generally low reflectivity away from these wavelengths. In the past, rugate filters have been crudely created by depositing successive layers of materials of different index of refraction onto a substrate. This method is limited by the ability to create extremely thin layers, by the availability of suitable materials that can be deposited in these layers, and by the stability of the resulting film against diffusion. Porous silica films overcome all of these limitations by allowing the continuous variation of the index of refraction in a film made of a stable material with no separate components or deposited layers. In addition, the same etching process used to create pores, when employed under certain conditions, is used to separate a film from its parent silicon wafer.

In some embodiments, film creation and separation is realized by anodically etching p-type, boron-doped, (100)-oriented silicon with <1 mΩ cm resistivity in a solution of 48% aqueous HF:ethanol (3:1 by volume). A computer-generated waveform containing the encoding information is used to control the electrochemical reaction. The porous silicon film is lifted off the crystalline silicon substrate using an electropolishing reaction consisting of a 4 mA/cm anodic current applied in a solution composition of 48% aqueous HF:ethanol (1:14.5 by volume) for 60 s. The resulting film, as thin as ten microns, is robust enough to require no substrate. The combination of common processing techniques and minimal material usage allows these films to be produced cheaply. Finally, the information in a rugate filter is encoded into the depth of the film, so the film can be divided into numerous small tags (tens of microns in x-y dimensions), each of which is a type of rugate microtag, without any loss of information, further reducing cost.

Porous silica rugate microtags offer a range of advantages over existing product labeling or authentication solutions. The advantages offered by a silica microtag originate in a number of ways. Because an optical spectrometer is required to observe the encoded signal, the barrier to decoding the signal, and even more so reproducing it, is much higher than with a typical UPC (Universal Product Code) barcode. Layered security schemes utilizing silica microtags attached to, or embedded within, an item to be authenticated, can include both information on the items' packaging (e.g., text, 2D barcodes), and information stored in the tag. The two pieces of information can be combined into a digital signature, such that a security violation would be noted if someone tampers with either the packaging or the item.

Since the microtags are encoded with information purely in their depth, rather than along their surface, they can be broken into pieces with full depth, with each piece still containing all of the encoded information. This makes porous silica microtags suitable for forensic applications, where the tag may be subjected to rough handling. As long as any full-depth piece of the tag can be recovered, the information is not lost. So even after the use and disposal of a product, in all but extreme situations a rugate microtag is expected to survive. This is in contrast to RFID (Radio-Frequency Identification), which requires internal electrical connectivity, and UPC codes which require that the surface of the label bearing the code remain intact.

The ability to make small tags is also an advantage. At sizes as small as 20 microns across, the tags are inconspicuous enough to avoid casual inspection. This is helpful for both security and forensic applications. Tagging systems that rely on larger tags may expect a consumer to remove the tag upon purchase, but a tag that is small enough to avoid notice will be less likely to be removed.

The microtag method and system (the "system") encompasses the entirety of the method for embedding information into a microtag, the method for measuring the optical reflectivity of the microtag, the 'channel code', or method for mapping the 1's and 0's of binary data ('information')

into controllable characteristics of the tag's spectral response, the apparatus required to make encoded films and tags and the method and apparatus to read encoded films and tags.

Figure 3:
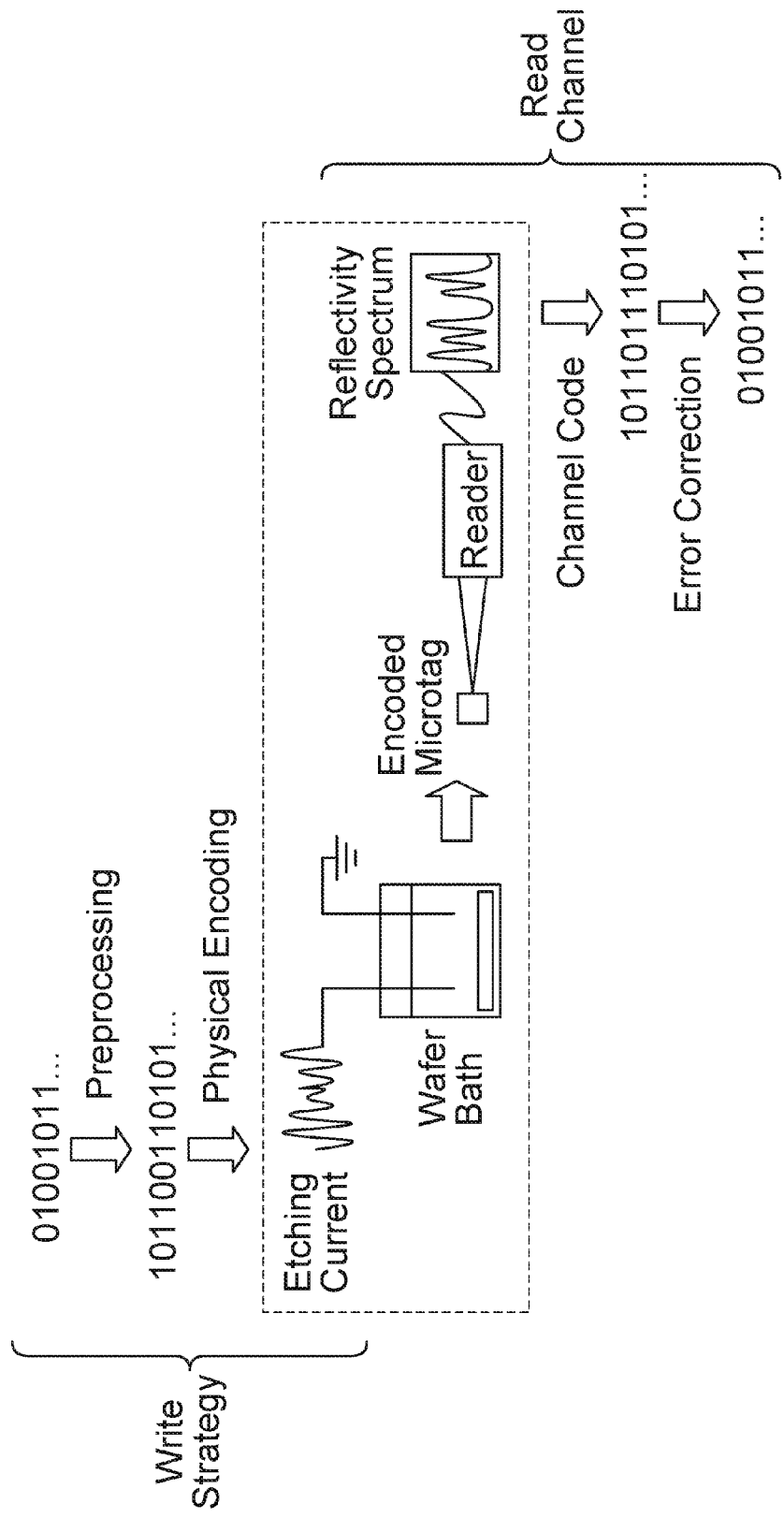
FIG. 3 is a block diagram illustrating an embodiment of basic system concepts from binary data input and encoding of a microtag to the readout, decoding, and error correction of the information stored on a microtag.

FIG. 3 is a block diagram illustrating an embodiment of basic system concepts from binary data input and encoding of a microtag to the readout, decoding, and error correction of the information stored on a microtag. In the example shown, a physical encoding process that encompasses the electrochemistry and material science for controlling the reflective spectral properties of porous silicon. The information for the tag is entered in to the write strategy system, which adds supplemental information (e.g., error correction code (ECC)). The write strategy system also encodes all the information in a manner appropriate for the physical encoding (e.g., an electrical current capable of achieving encoding the desired information in pores by etching). The write strategy is used to generate an encoded microtag which can then be read using a reader. The reader reads a reflectivity spectrum. The reflectivity spectrum is decoded to extract the channel code which is then checked and corrected for errors (e.g., ECC code and information is used to correct and check the data encoded in the microtag). In some embodiments, preprocessing, physical encoding, etching current determination, microtag encoding, channel code encoding, error correction code encoding are performed using a processor coupled to a memory where the memory is configured to provide the processor with instructions. In some embodiments, reading the microtag, error correction decoding, channel decoding, spectrum analysis are performed using a processor coupled to a memory where the memory is configured to provide the processor with instructions. In some embodiments, the processor executes software that instructs the processor for encoding and/or decoding of microtags.

Rugate filters, in contrast to Bragg filters, are known for lacking harmonics of the designed rugate peak frequency(ies). Reduction or elimination of harmonics simplifies decoding of reflectance spectra. However, rugate filters suffer from (i) sidelobes near each rugate peak due to the finite spatial extent of the index variation function, and (ii) interference fringes across the entire spectrum due to poor index matching at interfaces and surfaces. These two effects (the rugate effect including both peaks and sidelobes, and interference fringes) generally interfere, resulting in a more complex spectral structure. There are well-known techniques, such as index matching and apodization, that can be used to reduce the intensity of these effects ("rugate/ fringe interference"), and indeed it is prevalent and commonplace in the prior art of rugate filters that harmonics, sidelobes, or interference fringes are considered undesirable; much effort has gone into their reduction or elimination. The objective of decoding a rugate microtag is to retrieve as accurately as possible the information encoded into the microtag.

In some embodiments, sidelobes, interference fringes, and rugate/fringe interference are turned to useful advantage, such as encoding information, by a thorough understanding of how these interferences are created, and how to predictably generate, control, and decode the total spectral properties exhibited by optical films and tags, including using, rather than ignoring or suppressing, information encoded in sidelobes, interference fringes, and their resultant interferences.

In some embodiments, each frequency of the current density waveform used to etch a silicon wafer ("input waveform") has a defined position (energy), amplitude, and phase. When a rugate microtag is interrogated using optical irradiation and an optical spectrometer, the reflectance spectrum comprises a multitude of peaks. "Optical spectrometer" means herein a spectrometer operating in the visible band, including signal processing such as analog to digital converters in the output chain. Decoding reflectance spectra by suppressing or ignoring sidelobes, interference fringes, and their resultant interference, has had limited success in reconstructing the position (energy), amplitude, and phase of the input waveform; consequently, there has been limited success in decoding from the multipeak reflectance spectrum of a rugate microtag the information encoded in the microtag (i.e., originally encoded in the input waveform).

In some embodiments, information capacity of rugate microtags is increased by including sidelobes, interference fringes, and their resultant interferences in predictably encoding and decoding rugate microtags (i.e., to use the rugate "recovered phase" as an additional form of useful information, either separately, or in combination with rugate peak amplitude and wavelength). The optical tags produced using the method herein are called "phase tags" to distinguish them from prior art optical tags. Phase tags can use phase, amplitude, and/or peak position encoding and decoding, as explained below. The choice of whether encoding and decoding is done by phase, amplitude, and/or peak position is driven by several factors, such as i) data capacity, ii) security, iii) ease of implementation, or iv) computational complexity (cost).

The ability to finely control the optical reflectivity spectrum enables many different possibilities for encoding data. The most obvious is a binary scheme, where numerous peaks of strong reflectivity are processed into the optical reflectivity spectrum, and information is recovered by measuring the presence or absence of a peak at a set of predetermined wavelengths. Up to 20 reflectivity peaks were shown achievable.

Control can also be exerted over the amplitude and width of a reflectivity peak and peak spacings. Each additional spectral feature that can be controlled offers a means to store more information. For example, in some embodiments 10 peaks are produced at 4 amplitude levels, suggesting that $4^{10}$— or ~1 million—spectral states might be possible, which corresponds to ~20 bits of information ($2^{20}$=1 million). Again, the control required to utilize those 10 peaks to actually encode and decode 20 bits of information was not demonstrated.

Below are some examples of 4" heavily-doped silicon wafers using the prior art techniques described above. These examples demonstrate some of the variations and limitations encountered in attempting to implement the prior art encoding methods described above.

Figure 4:
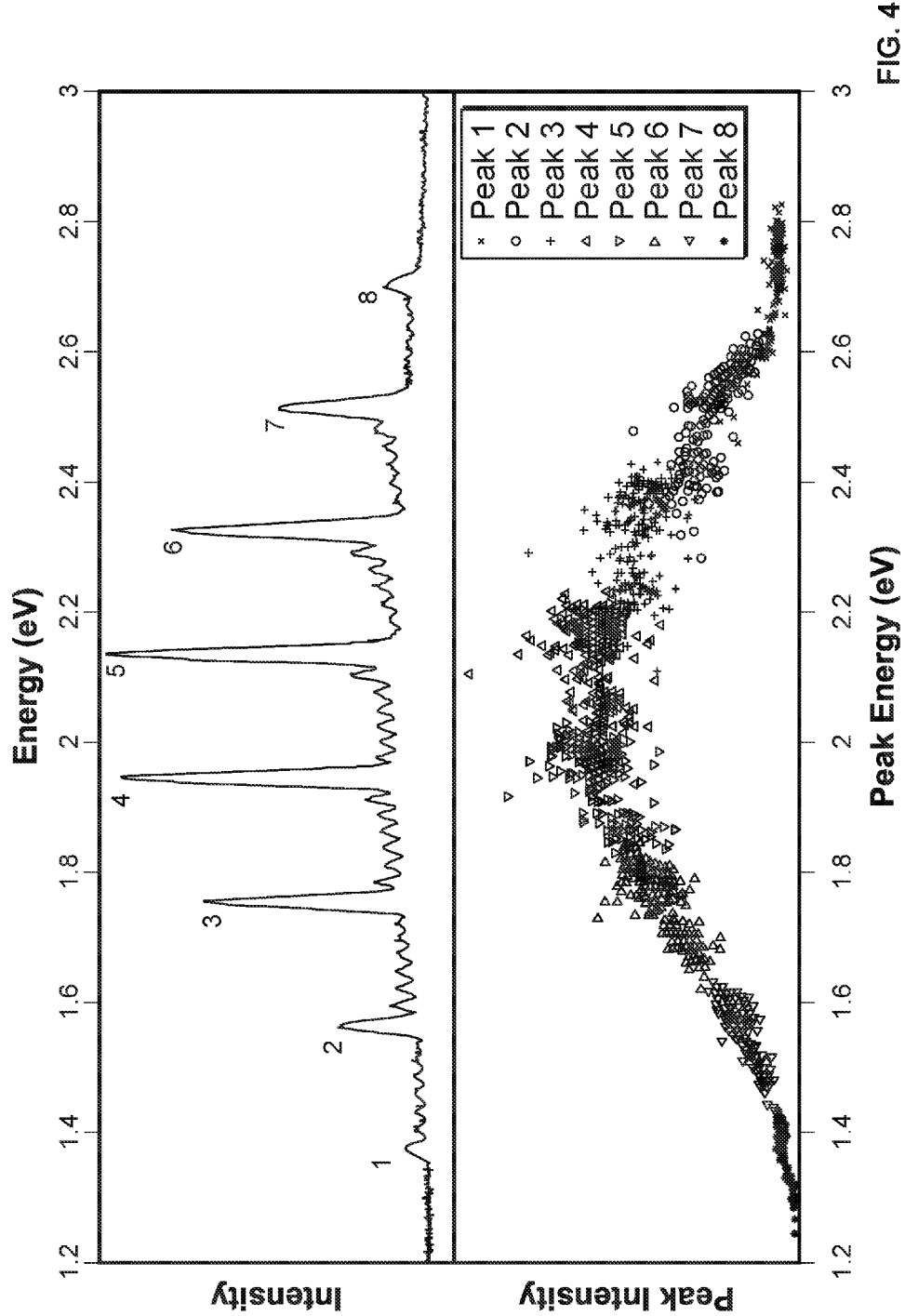
FIG. 4 are graphs illustrating a single and a composite reflectance spectrum read from an embodiment of microtags without any normalization.

FIG. 4 are graphs illustrating a single and a composite reflectance spectrum read from an embodiment of microtags without any normalization. In the example shown, the upper graph shows the positions of 8 optically read peaks based on the pore density in a microtag. The lower graph shows a composite of each of the 8 peaks read back from a set of tags from 9 identically made films from multiple wafers. As can be seen from the lower graph, variations in peak energy (position) are such that one cannot immediately discern peak position when tags are produced in quantity utilizing the majority of a single, 4" wafer surface.

Figure 5A:
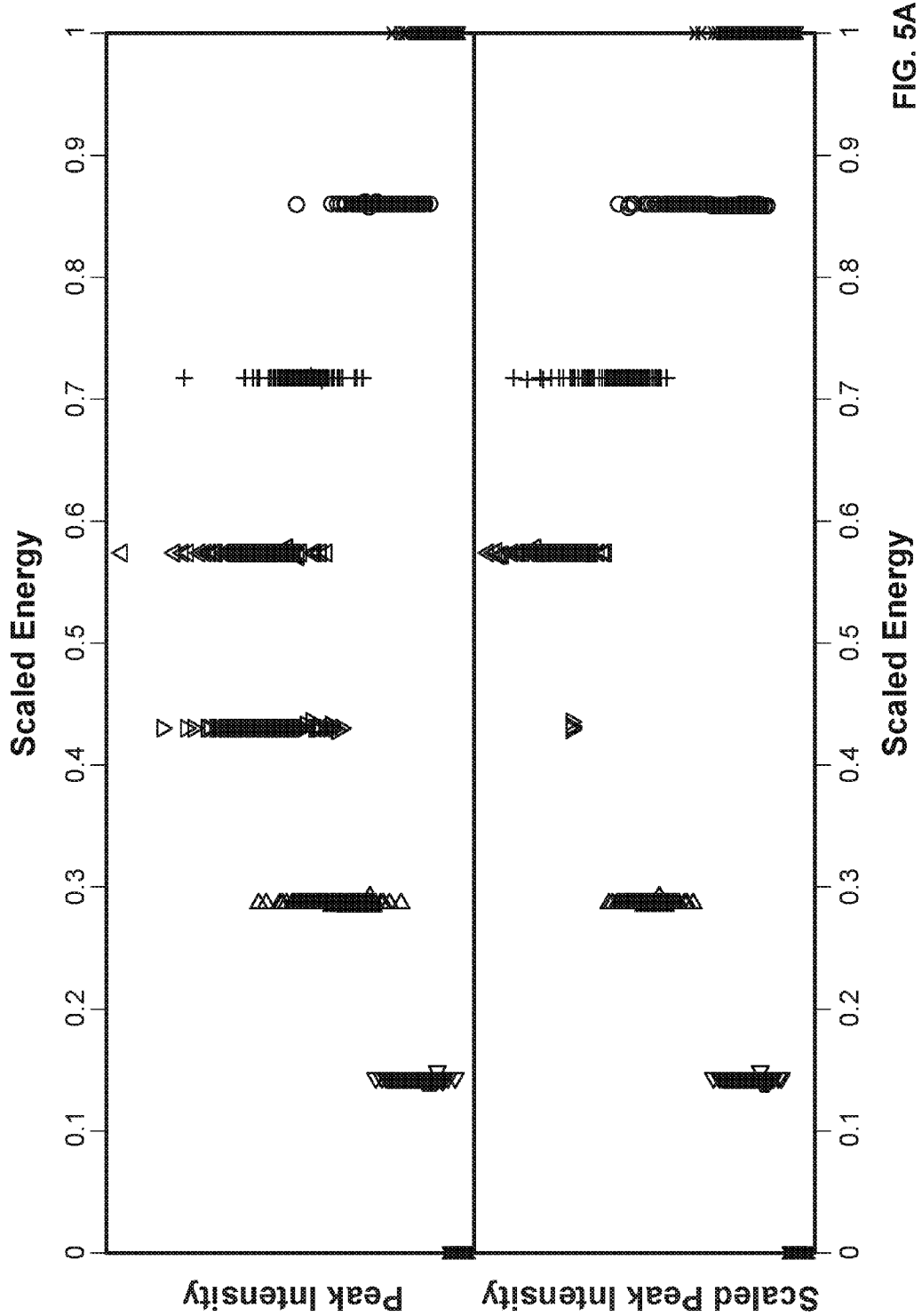
FIG. 5A are graphs illustrating embodiments of normalized peak energies.

FIG. 5A are graphs illustrating embodiments of normalized peak energies. In the example shown, the peaks in the upper plot are normalized by using the lowest and highest energy peaks as references and rescaling the peak energy. The relative peak energy is actually well maintained. This allows information to be encoded in peak position despite the observed manufacturing process variations in peak position. The top panel shows the same data that is plotted in the bottom panel of FIG. 4, but with the energy of each point rescaled using the lowest and highest energy peaks in each spectrum as reference markers. The rescaled energy scale measures the position of every peak in each spectrum as a fraction of the energy difference between the two reference peak positions. The lower plot of FIG. 5A uses a similar technique (using the amplitude at a given position and rescaling each data point as a fraction of that amplitude) shows that variations in peak amplitude cannot be as handily removed as for the case of variations in peak position. A comparison of the amplitude range of the fourth position and the amplitude range at the seventh position illustrates overall range variation; moreover, the amplitudes do not resolve in discrete clusters of amplitudes at any given position. All measured peaks in this plot were encoded using the same amplitude, so discrete clusters in the y-axis are not expected. The lesson from this plot is that variation in measured peak amplitude is not reduced across the spectrum by normalizing the peak amplitudes. Amplitude that cannot be assigned with confidence to a known position, or an amplitude at a given position that cannot be determined with confidence cannot be used to decode a rugate microtag. In the example shown, the process variations in the etching of a wafer mean that the values associated with amplitude and some positions in the coding and decoding of rugate particles are potentially lost, which degrades the information capacity of rugate microtags.

The dominant cause of tag manufacturing process variation is in the etching rate. Rugate peaks are altered by etching rate variation in predictable way. Referring to Eqn. (3) below, we can extract the frequency of a rugate peak ($f_r$) as a function of etching rate.

$$f_r = \frac{2n_0}{\lambda} = 2n_0 \cdot \frac{f_t}{v_e}$$

In Equations (1) and (2), $n_0$ is the average index of refraction of the film, $f_t$ is the temporal frequency of the etching current, and $v_e$ is the etching rate. We can consider a change in the etching rate by a small fraction $\gamma$ of the original $v_e$. Equation (1) above then becomes $$f_r = 2n_0 \cdot \frac{f_t}{v_e \cdot (1+\gamma)} = 2n_0 \cdot \frac{f_t}{v_e} \cdot (1 - \gamma + O(\gamma^2)) = f_r \cdot (1 - \gamma + O(\gamma^2)) \quad \text{Eqn. 2}$$

For small changes in the etching rate ($\gamma \ll 1$), the rugate peak positions change in a way which can, to a good approximation, be removed with linear rescaling in energy (or frequency) (e.g., see top of FIG. 5A).

The above energy rescaling method requires that the reference peaks appear in the same place in every spectrum. As such, the reference peaks cannot hold any information. To avoid using two peaks for scaling and not for information storage, an alternate method of storing information is used that inherently includes partial scaling information within each spectrum. The method requires restricting peak positions to a discrete number of possible energies. For example, in the spectrum shown in the top panel of FIG. 4, the rugate peaks are encoded (i.e., the etching waveform is generated and applied to the wafer bath) using etching current frequencies that correspond to seven times a base frequency step between each rugate peak. Thus, each step delineates an allowed rugate peak position, providing 49 possible rugate peak positions. The rugate peak at the lowest scaled energy is then used as the single reference peak. Then next step is to try to determine empirically ("guess") the number of allowed rugate peak positions that lie between the reference peak and the rugate peak with the highest scaled energy.

Figure 5B:
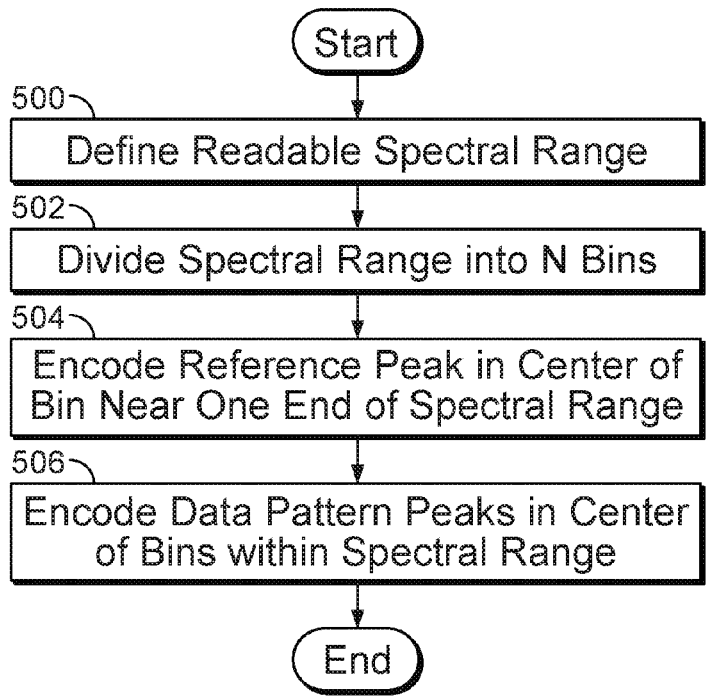
FIG. 5B is a flow diagram illustrating an embodiment of a process for encoding energy peaks of an identifier.

FIG. 5B is a flow diagram illustrating an embodiment of a process for encoding energy peaks of an identifier. In the example shown, in 500 a readable spectral range is defined. In 502, the spectral range is divided into N bins. In 504, a reference peak is encoded in center of a bin near one end of the spectral range. In 506, data pattern peaks are encoded in the center of bins within the spectral range.

Figure 5C:
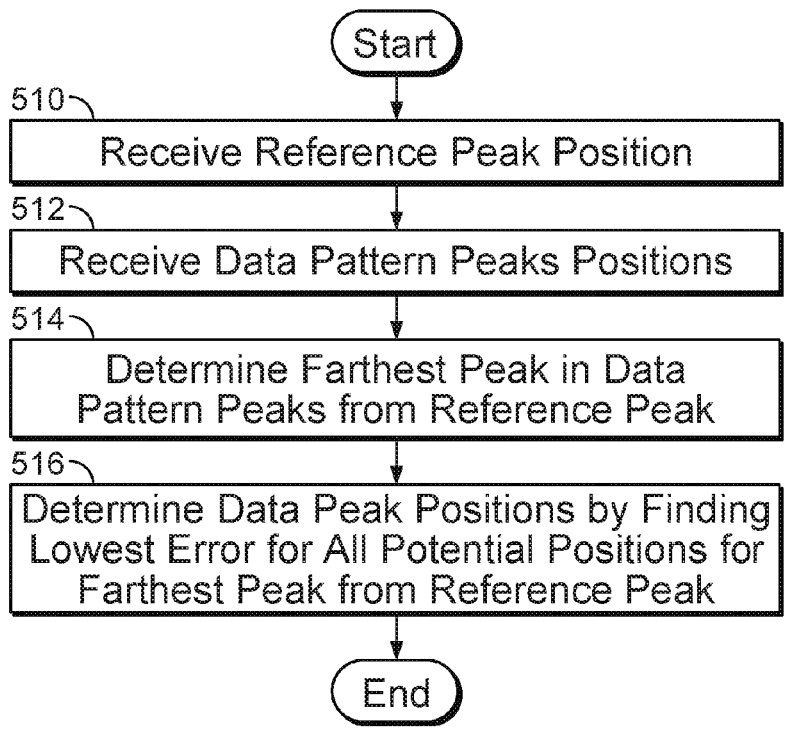
FIG. 5C is a flow diagram illustrating an embodiment of a process for decoding energy peaks of an identifier.

FIG. 5C is a flow diagram illustrating an embodiment of a process for decoding energy peaks of an identifier. In the example shown, in 510 a reference peak position is received. In 512, data pattern peaks positions are received. In 514, a farthest peak of the data peaks from the reference peak is determined. In 516, determine data peak bins by finding lowest error for all potential positions of farthest peak from reference peak.

Figure 6:
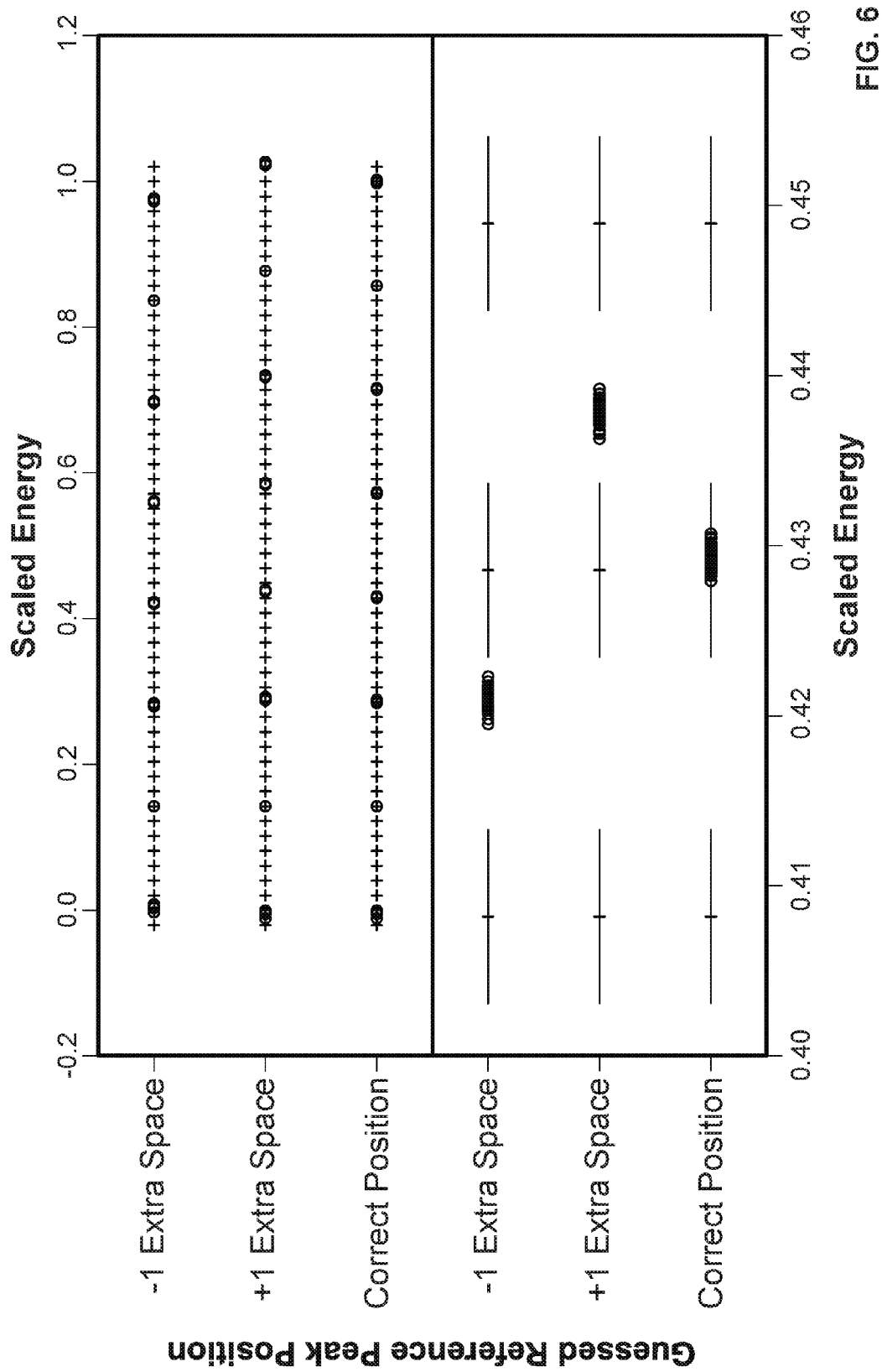
FIG. 6 are graphs illustrating an embodiment of allowed rugate peak positions.

In some embodiments, within an allowed envelope of where peaks are possible, a number of bins for peaks are determined (e.g., 65 bins, 50 bins, etc.). A readable spectral range is defined, such that no matter how the peaks shift during manufacturing they are still within the spectral range of the reader. That range is divided into N bins, any of which can contain a peak. A reference peak is encoded near one end of the spectral range—for example, bin 1. The rest of the peaks in a data pattern are encoded (e.g., etched) to each lie at the center of a bin. In some embodiments, there is a maximum allowable distance between peaks to ensure that there are enough peaks to give a good triggering signal for when the reader is searching for tags. The reader then finds the reference peak (e.g., the peak in bin 1) and any other peaks in the range of the reader including the peak the farthest from the reference peak. The bin number of the peak farthest from the reference peak is found by assuming a bin number ranging from bin N to the reference bin. For each of these assumed bin numbers, the bin centers are calculated for the whole readable range and each peak assigned to its closest bin center. Then the squared deviation of each peak from its bin center is added together for all peaks in each case, and the highest bin number with the smallest total squared deviation is chosen as most likely. Then all the peak positions are known in terms of scaled energy. FIG. 6 are graphs illustrating an embodiment of allowed rugate peak positions. In the example shown, the allowed rugate peak positions (bars) are plotted with the measured peak positions displayed in FIG. 5A (circles) for 3 different guesses for the actual position of the highest scaled energy rugate peak. The bottom panel is a zoomed-in look at the middle section of the top panel shows all 49 possible rugate peak positions, with 3 different guesses (applied to the data from FIG. 5A) for the number of allowed rugate peak positions. In the bottom panel, a closer look at the effect of different guesses at the correspondence between allowed peak positions and measured positions is displayed for a peak near the center of the spectral range. It is clear that the correct guess (49 spaces) provides the only reasonable fit.

Figure 7:
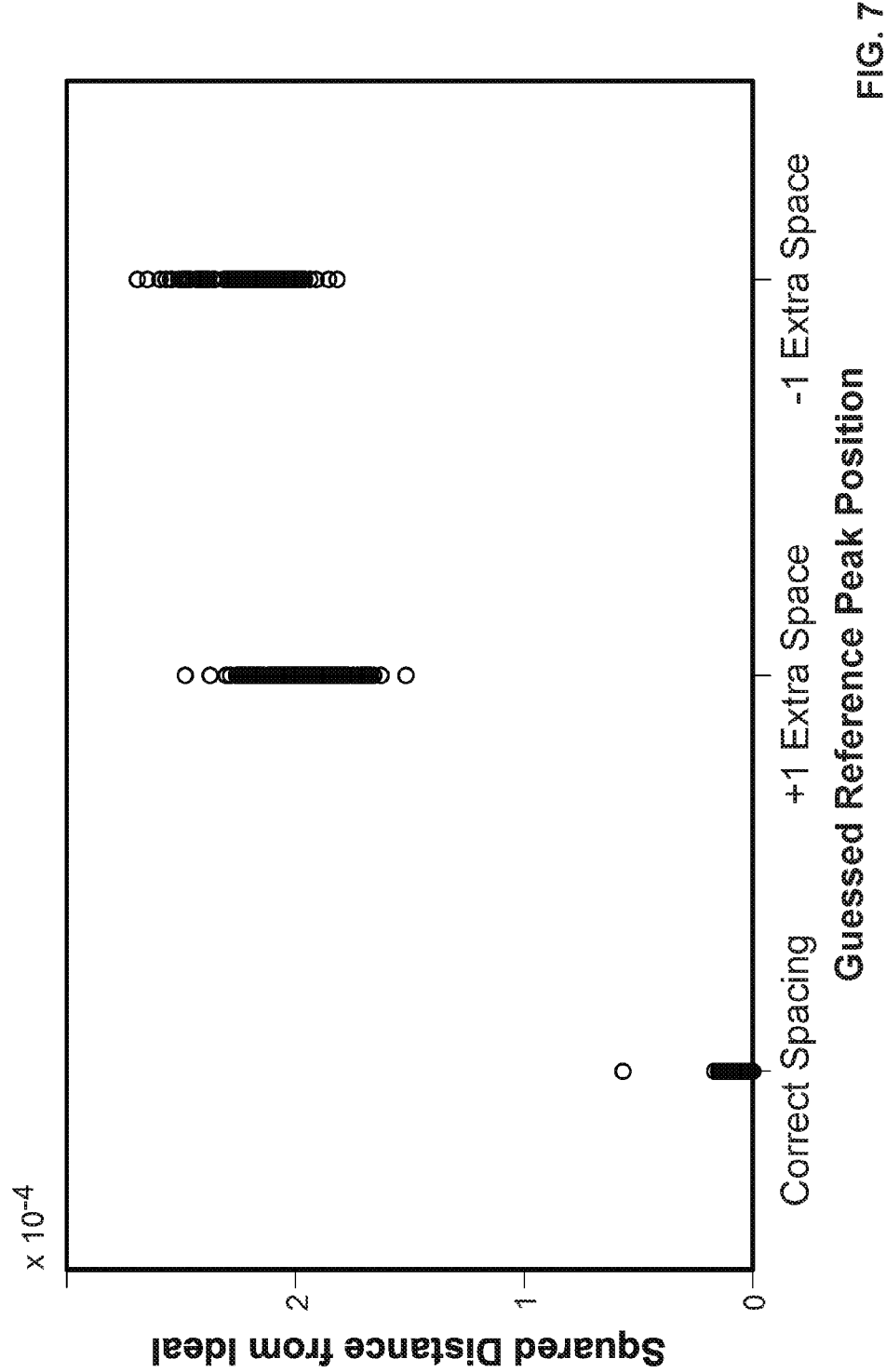
FIG. 7 is a graph illustrating the squared error in measured peak position summed for each peak in a spectrum in one embodiment.

FIG. 7 is a graph illustrating the squared error in measured peak position summed for each peak in a spectrum in one embodiment. In the example shown, the squared error in the measured peak position is plotted as a function of different guesses for the actual position of the highest scaled energy peak used as a second reference. Each spectrum from FIG. 6 is plotted. The empirical accuracy ("goodness") of each guess is quantified by summing the squared difference of each peak position from the calculated allowed positions for each guess. Then the guess with the lowest squared difference can be taken as the best choice and used for decoding.

With the one reference peak scaling described above, information is encoded using variation in peak position and number. The information capacity is determined by the number of allowed peak positions, the smallest achievable distance between two peaks, and to a lesser extent the largest achievable distance between two peaks.

Both (i) rescaling position data obtained from reflectance spectra, and (ii) restricting peak positions to a discrete number of possible energies during encoding and fitting data obtained from reflectance spectra to the known number of energies, degrade the potential information capacity of rugate microtags. Accordingly there is demand for an improved method of decoding rugate microtags that provides a substantial improvement in information capacity, especially a method of including rugate phase information, i.e., values of phase $\phi_i$, (as explained below), in predictably encoding and decoding rugate microtags. The system solves the technical problem of including rugate phase information in predictably encoding and decoding rugate microtags, thereby substantially increasing the information capacity of rugate microtags.

The system decodes rugate microtags by calculating values of rugate phase $\phi_i$, or reliable proxies of rugate phase $\phi_i$, (individually and collectively, "rugate phase information"). The use of rugate phase information does not detract from the information storage mechanisms of the existing art, but adds a new way to store information that can be used to add to the total information capacity of a rugate microtag.

The term n(z) is the refractive index variation n of a simple one-peak rugate filter at a function of depth z in an etched film or tag.

$$n(z) = n_0 + \frac{n_a}{2}\sin\left(\frac{4\pi n_0 z}{\lambda_i} + \phi_i\right) \qquad \text{Eqn. 3}$$

This can be easily extended to "multiple peak" rugate filters by adding additional sine terms of appropriate frequency and phase. Here $\lambda_i$ is the wavelength of the rugate peak, $n_0$ is the average refractive index, $n_a$ is the peak-to-peak refractive index variation, and $\phi_i$ is the rugate phase.

The reflectivity of the rugate filter, $r_{rug}$, can be adapted as:

$$r_{rug} = \frac{\frac{-\varrho\omega}{4}\sinh\left\{T\cdot\left[\left(\frac{\varrho\omega}{4}\right)^2 - (\omega-\omega_i)^2\right]^{\frac{1}{2}}\right\}e^{i\phi_i}}{\left[\left(\frac{\varrho\omega}{4}\right)^2 - (\omega-\omega_i)^2\right]^{\frac{1}{2}}\cdot\cosh\left\{T\cdot\left[\left(\frac{\varrho\omega}{4}\right)^2 - (\omega-\omega_i)^2\right]^{\frac{1}{2}}\right\} + i\cdot(\omega-\omega_i)\cdot\sinh\left\{T\cdot\left[\left(\frac{\varrho\omega}{4}\right)^2 - (\omega-\omega_i)^2\right]^{\frac{1}{2}}\right\}} \qquad \text{Eqn. 4}$$

where $$\omega_i = \frac{2\pi}{\lambda_i}, \omega = \frac{2\pi}{\lambda}, T = n_0\cdot L, \text{ and } \varrho = \frac{n_a}{n_0} \qquad \text{Eqn. 5}$$

$\omega$ in Equation 4 is the optical frequency; T is the optical thickness; L is the physical thickness of a given filter, film, or tag; and $\varrho$ is the ratio of the peak-to-peak index variation to the average index.

The above expression $r_{rug}$ includes the rugate peak and its sidelobes, but not the effects of filter surfaces and interfaces. The additional reflectivity in the pure rugate case is solely from the surfaces of the filter. Equation 6 below is for the reflectivity, $r_s$, caused by the interference of internal reflections from the surfaces of a filter immersed in air (the simplest case for discussion purposes), but it is straightforward to extend Equation 4 to include buried interfaces or different immersed media. This discussion will continue the analysis of the simple case of a rugate filter immersed in air.

$$r_s = \frac{\left(\frac{1-n_0}{1+n_0}\right)(1 - e^{-2i\omega T})}{1 - \left(\frac{1-n_0}{1+n_0}\right)^2 e^{-2i\omega T}} \qquad \text{Eqn. 6}$$

Figure 8:
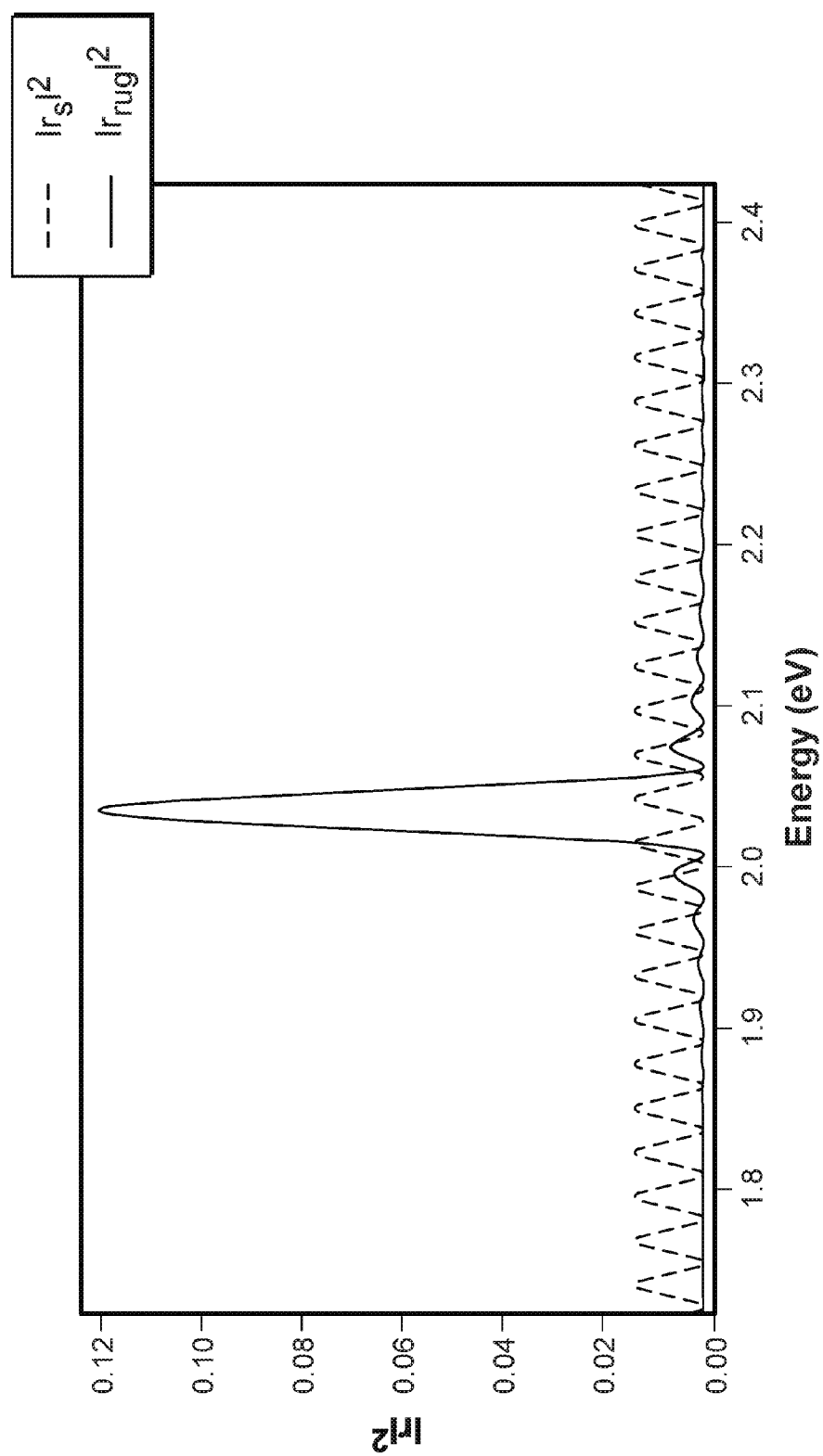
FIG. 8 is a graph illustrating the squared magnitude of both the surface-derived interference fringes $r_s$ and a typical rugate peak $r_{rug}$ in one embodiment.

The total reflectance of a rugate filter with surfaces, R, is measurable using a white light and optical spectrometer, is the square of the total reflectivity, $$R = (r_{rug} + r_s)\cdot(r_{rug} + r_s)^* = |r_{rug}|^2 + |r_s|^2 + r_{rug}^*\cdot r_s + r_{rug}\cdot r_s^* \qquad \text{Eqn. 7}$$

Where * refers to the complex conjugate. Equation 7 above contains 4 terms, two of which ($r_{rug}\cdot r_s^* + r_{rug}^*\cdot r_s$) are the so-called cross terms. The cross terms contain all of the interference between $r_{rug}$ and $r_s$. FIG. 8 shows the magnitude squared of both $r_{rug}$ and $r_s$ for typical conditions and one encoded rugate peak. While $|r_s|$ oscillates with a consistent amplitude across all energies, $|r_{rug}|$ is sharply peaked at the encoded rugate energy and falls to nearly zero quickly away from the encoded rugate energy. From this we can conclude that the cross terms, which contain $r_{rug}$, are also largest near the encoded rugate energies, and become very small quickly away from the encoded rugate energies. By fitting a measured reflectance spectrum at frequencies far from the rugate peak to the function $|r_s|^2$, one can obtain fitted values for $n_0$ and the optical thickness T. Using these measured values, it is possible to then fit the portion of the reflectance spectrum near the rugate peak to the entire R function above, with only $\lambda_i$, $\phi_i$, and $\varrho$ as unknowns in Equation 7. These fit parameters are close enough to orthogonal to allow a decisive fit.

FIG. 8 is a graph illustrating the squared magnitude of both the surface-derived interference fringes $r_s$ and a typical rugate peak $r_{rug}$ in one embodiment. In the example shown, while $|r_s|^2$ has equal intensity maxima across the range of energies, $|r_{rug}|^2$ contains appreciable intensity only near the rugate peak. To apply the above method, the variability in the etching rate must be accounted for during microtag manufacture. The interference effect depends on the relative position in frequency (or energy) of a rugate peak and the surface-derived interference fringes. As shown in FIG. 8, the surface-derived reflectivity is periodic in energy, comprising of repeating identical maxima and minima. The position of each maximum in frequency, $f_m$, is $$f_m = \frac{2m+1}{4n_0\cdot t\cdot v_e}(m = 0, 1, 2, 3, \dots) \qquad \text{Eqn. 8}$$

where $n_0$ is the average index of refraction of the film, t is the total etching time, and $v_e$ is the etching rate. The $1/v_e$ dependence is the same dependence on etching rate as the rugate peak position. Thus changes in etching rate preserve the relative position of rugate peaks and surface-derived interference fringes, and the interference effects do not depend strongly on etching rate.

Figure 9:
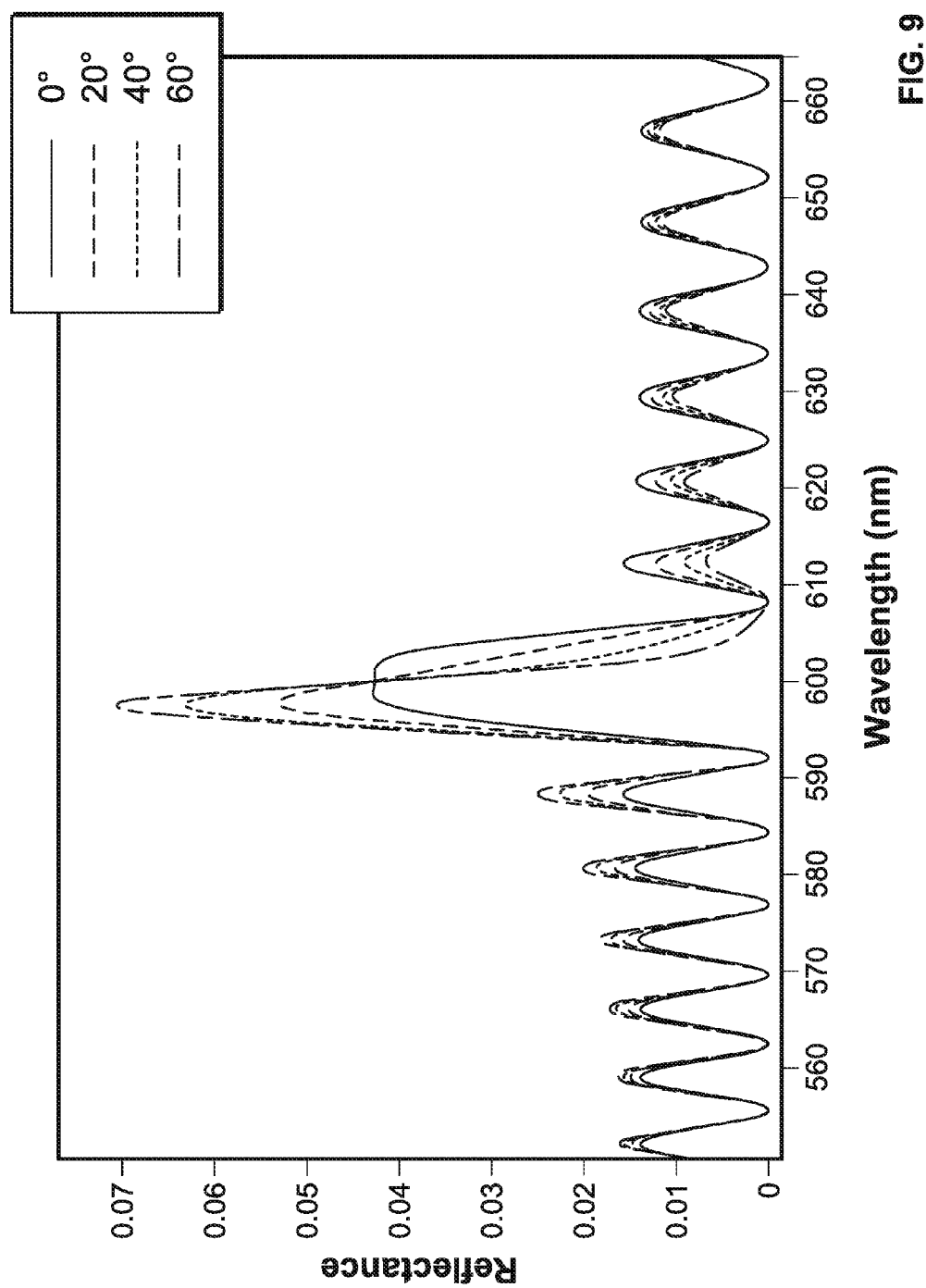
FIG. 9 is a graph illustrating an embodiment of a calculated rugate filter reflectance spectrum.

The ability to effectively extract the fundamental peak position $\lambda_i$, peak amplitude (related to $\varrho$), and rugate phase $\phi_i$ from a rugate filter reflectance spectrum offers a significant advantage for information storage. In some embodiments, a rugate tag system relies on designing and measuring changes in the reflectance peak positions and amplitudes to store information. This means at least one reference peak must be created in the encoding of tags in order to judge relative peak amplitudes or the relative position of other peaks. However, as shown in FIGS. 4 and 9, both the apparent peak amplitude and its position in wavelength depend on the rugate phase. This behavior is due to interference between $r_{rug}$ and $r_s$. These interference effects, and associated uncertainties in decoding, substantially limit the information capacity of an industrial application of prior art methods. In reality, peak amplitude and peak shape (and therefore "apparent peak position") depend on rugate phase, which in turns depends upon interference between $r_{rug}$ and $r_s$. Thus, in prior art methods, which interrogate rugate peaks generically and assume, inter alia, Gaussian or pure sinc-like form, not only is the interference treated as noise, which reduces the information capacity of the tags, but "apparent peak positions" (arising from asymmetric shapes) in the decoded output does not accurately reflect the encoded peak positions in the etching waveform.

By encoding, interrogating, and decoding rugate microtags with phase in mind, the system achieves an increase in the information capacity of the microtag by using phase as all or part of a signal rather than considering it noise.

In some embodiments, information is encoded using the phase $\phi_i$ of a rugate peak in the following way. A phase value $\phi_i$ is chosen for the rugate peak of interest. While $\phi_i$ can take on any value, values of $\phi_i$ greater than $2\pi$ or less than zero result in repetition of spectra created using values from zero to $2\pi$. It may be convenient to use values of $\phi_i$ that lie in any $2\pi$ range independent of absolute values of $\phi_i$. $\phi_i$ is physically encoded by electrochemically etching and creating a nanoporous filter using the rugate index of refraction variation $n(z)$ as shown in Eqn. 1, using the chosen value of rugate phase $\phi_i$.

FIG. 9 is a graph illustrating an embodiment of a calculated rugate filter reflectance spectrum. In the example shown, the variation of a rugate filter reflectance spectrum obtained by altering a single-frequency etching waveform by phase alone (constant frequency and amplitude) in a twenty degree increments. In each case only one peak is encoded, at constant wavelength and amplitude. Each spectrum corresponds to a different rugate phase.

To decode the phase, the reflectance spectrum is measured and the result compared to the functional form of R (Eqn. 7), preferably by a fitting algorithm. The fitting algorithm may utilize a number of constants as convenient to solve for the parameters of interest. It is not required to solve Equations 4 to 6 in their entirety of detail; it may be adequate to approximate some portions of the equations. For example, in equation 6, in both the numerator and denominator $n_0$ appears in the same form, which we can define as $\delta$:

$$\delta = \frac{n_0 - 1}{n_0 + 1}$$

In the rugate microtags, the average refractive index $n_0$ is about 1.2, so $\delta$ is on the order of 0.1.

Figure 10:
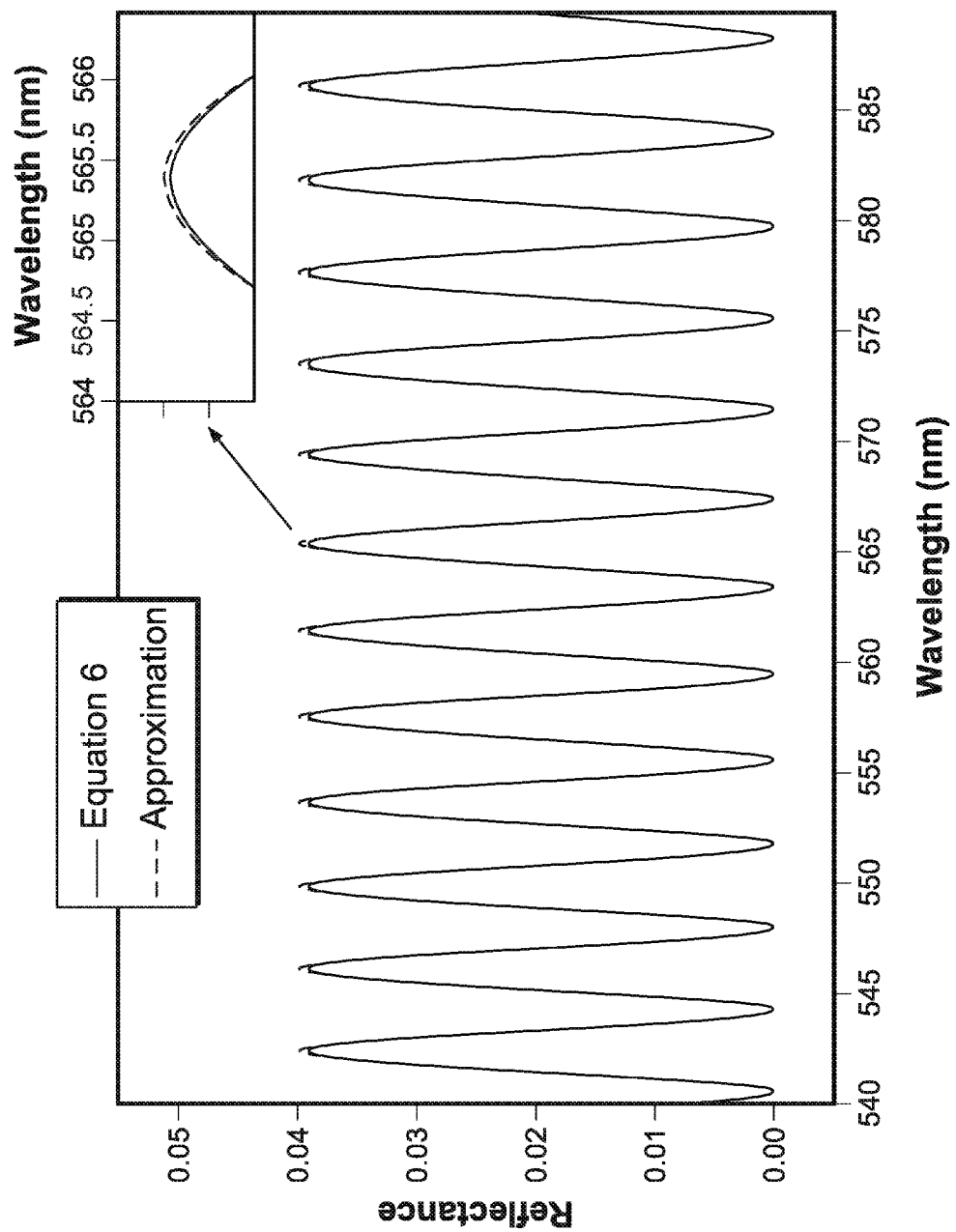
FIG. 10 is a graph illustrating an embodiment of a comparison of full surface-derived reflectance to a simple approximation.

FIG. 10 is a graph illustrating an embodiment of a comparison of full surface-derived reflectance to a simple approximation. In the example shown, the solid line shows Equation 6 evaluated with $\delta$=0.1 and T=40 um. The dashed line shows the effect of ignoring the exponential term in the denominator. The lines are close to the same, with the maximum difference at the top of the peak near 565 nm enlarged in the inset. Referring to equation 6, the exponential terms are of order 1, so the exponential term of the denominator is of order 0.01, and can be ignored to produce a very close approximation from a simpler equation. As long as the important functional characteristics of Equations 4 to 7 are maintained, it is up to the user to determine the level of granularity that is useful.

In any case, since the rugate phase $\phi_i$ is a parameter of R via Equation 4, once the fitting is complete, the original phase $\phi_i$ is obtained. This method is possible for any or all of the desired parameters used in both the index of refraction variation $n(z)$ (Equation 3) and the functional form of R (Equation 7). The fitting is done computationally using only the reflectance spectrum, and without need of a reference peak.

Figure 11:
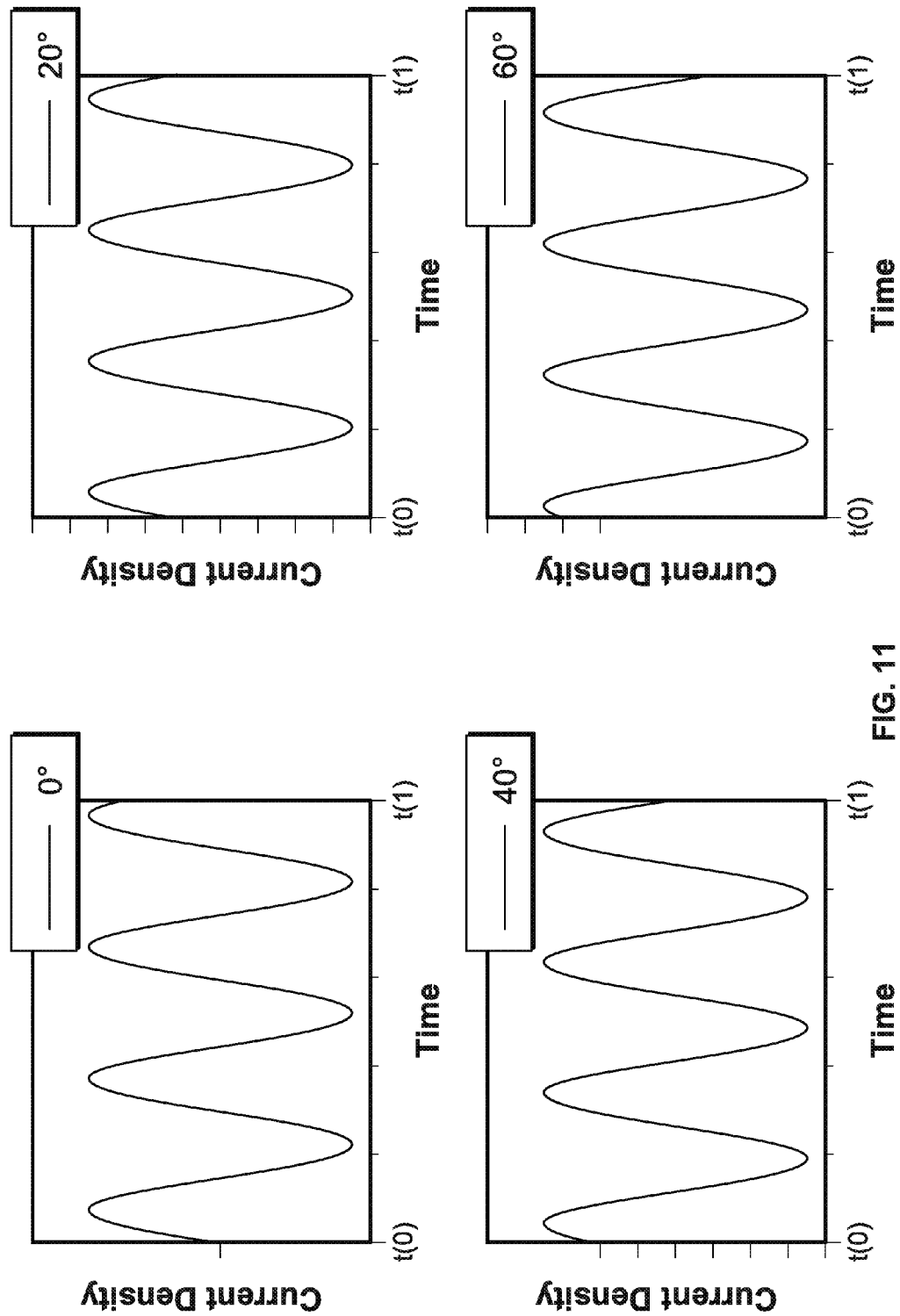
FIG. 11 are graphs illustrating embodiments of four different etching waveforms of the same frequency and amplitude, but different phases.

FIG. 11 are graphs illustrating embodiments of four different etching waveforms of the same frequency and amplitude, but different phases. In the example shown, each phase could correspond to a different piece of data. As an example of data storage and retrieval using the method described above, four different microtags are encoded using etching current density waveforms, all composed of the same single frequency and the same amplitude, but differing in initial rugate phase $\phi_i$. Once manufactured, the reflectance of each microtag is measured.

Figure 12:
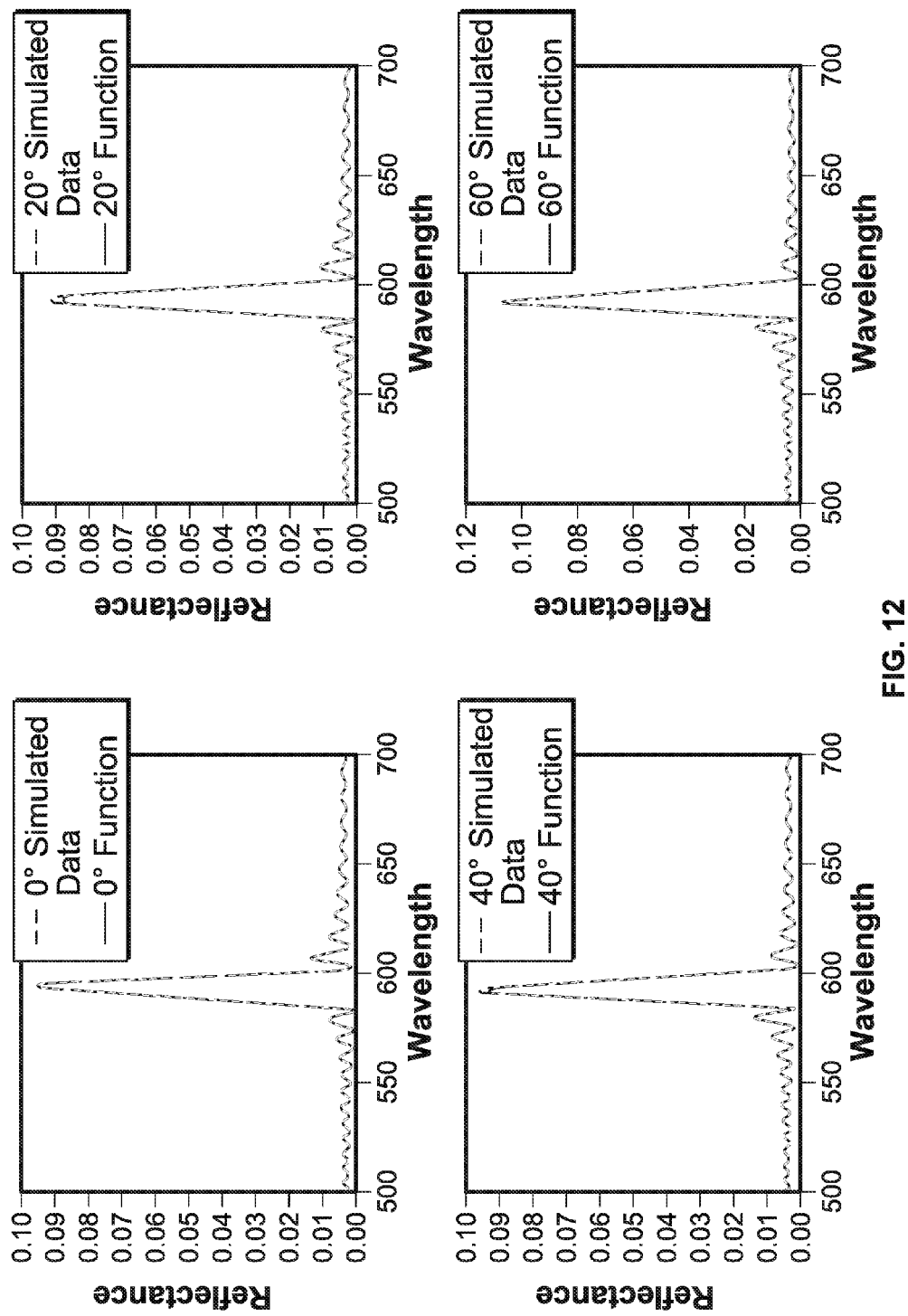
FIG. 12 are graphs illustrating an embodiment of simulated reflectance spectra corresponding to the four current density waveforms along with fitted spectra.

FIG. 12 are graphs illustrating an embodiment of simulated reflectance spectra corresponding to the four current density waveforms along with fitted spectra. In some embodiments, the four current density waveforms correspond to those shown in FIG. 11 (dotted lines) and the fitted spectra are obtained using Eqn. 7 (solid lines). In the example shown, a simulated spectrum for each of the four current density waveforms is shown. Equation 7 is fitted to each spectrum by using an algorithm such as non-linear least squares. The output of the fit is a value and uncertainty for each parameter in the fit equation, including rugate phase $\phi_i$. Examples of equation 7 calculated for each simulated spectrum are also shown. Depending on the quality of the spectrometer and signal processing used for data capture, this method enables one to accurately store and read many more different phases than the four used in this example.

FIG. 9 shows that the rugate phase controls a number of spectral properties, notably the rugate sidelobe asymmetry and the peak width. Elimination of fitting the function R may be useful to reduce computational complexity (hence cost) of the overall system implementation.

Figure 13:
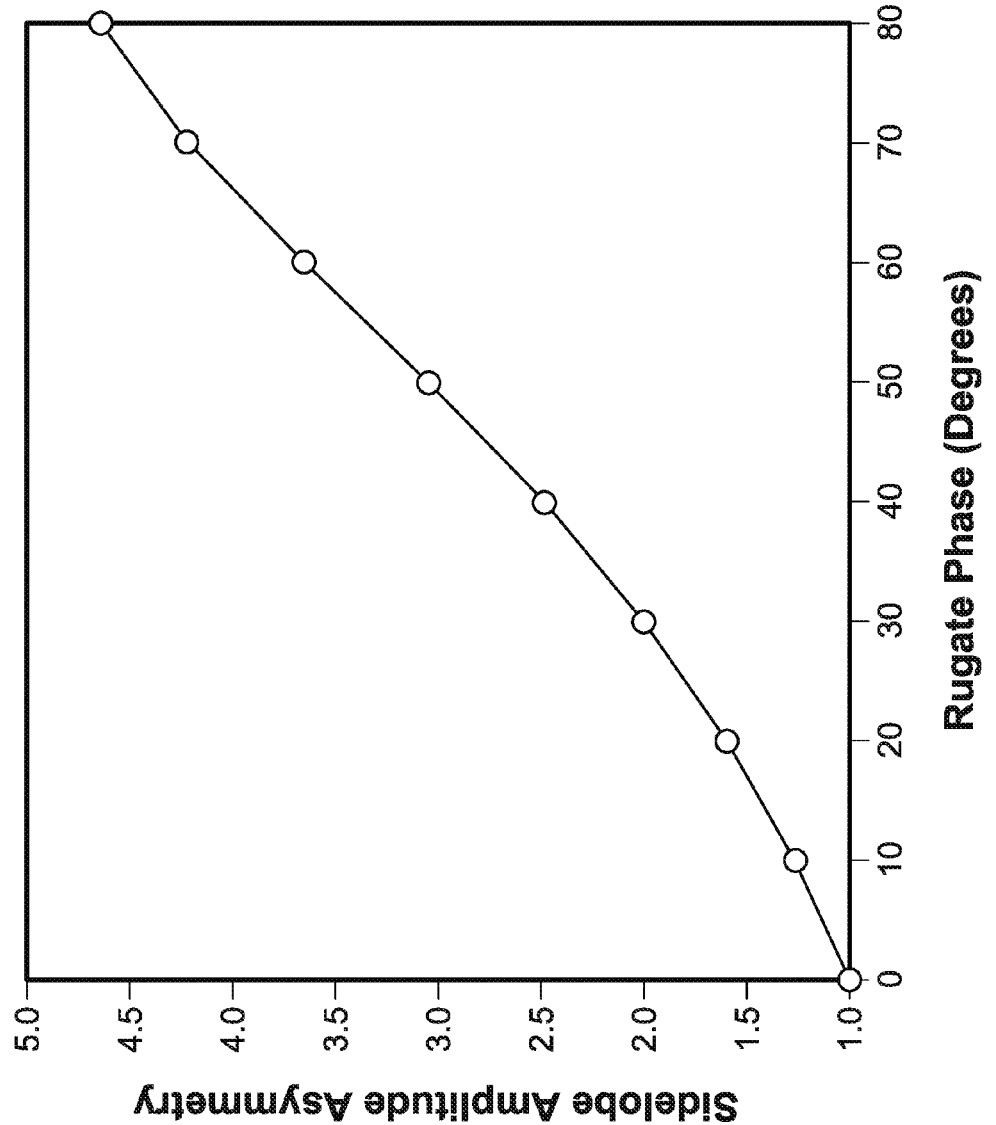
FIG. 13 is a graph illustrating an embodiment of a relation between sidelobe asymmetry and rugate phase.

FIG. 13 is a graph illustrating an embodiment of a relation between sidelobe asymmetry and rugate phase. In the example shown, by measuring the ratio of sidelobe amplitudes in each spectrum shown in FIG. 4, a clear indication of rugate phase can be extracted. This is the simplest of numerous techniques that may be used to determine rugate phase from a reflectance spectrum. Of many potential spectral properties that could be used to eliminate fitting the function R and associated computation, yet be able to accurately infer controllable index function variables, the sidelobe asymmetry is particularly convenient to measure, since it requires no reference information. Although the spectral effect of a change in rugate phase clearly exists over a range of wavelengths near the rugate peak, phase information can be extracted using as few as two data points, as shown in FIG. 13; the two data points can then be used to compute a proxy for rugate phase $\phi_i$, in this case sidelobe asymmetry.

Figure 14:
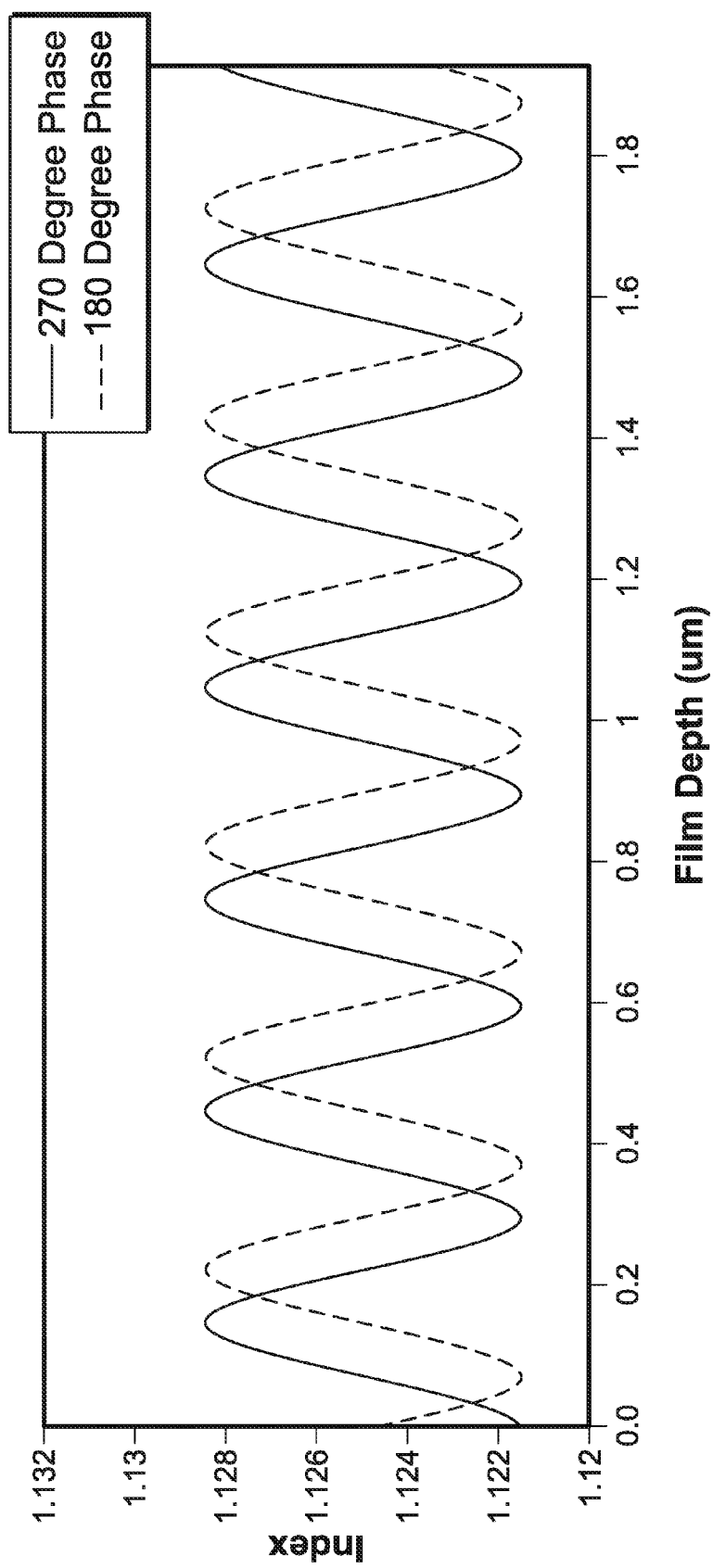
FIG. 14 is a graph illustrating an embodiment two rugate index profiles.

FIG. 14 is a graph illustrating an embodiment two rugate index profiles. In the example shown, two rugate index profiles are shown that were generated in MatLab using values $n_o$=1.125, $n_a$=0.004, $\lambda$=674.2 nm, $\phi_1$=180 deg, and $\phi_2$=270 deg for values of z ranging from 0 to 2 μm. The graph illustrates two different sine-wave index profiles, differing only by phase (180 degrees and 270 degrees respectively); i.e., FIG. 14 compares the sine-wave index profiles of (i) a first rugate microtag produced with an etching current density waveform consisting of a single sine wave of frequency X and (ii) a second rugate microtag produced with an etching current density waveform consisting of a single sine wave of the same frequency X, but with a 90 degree delay in phase.

Figure 15:
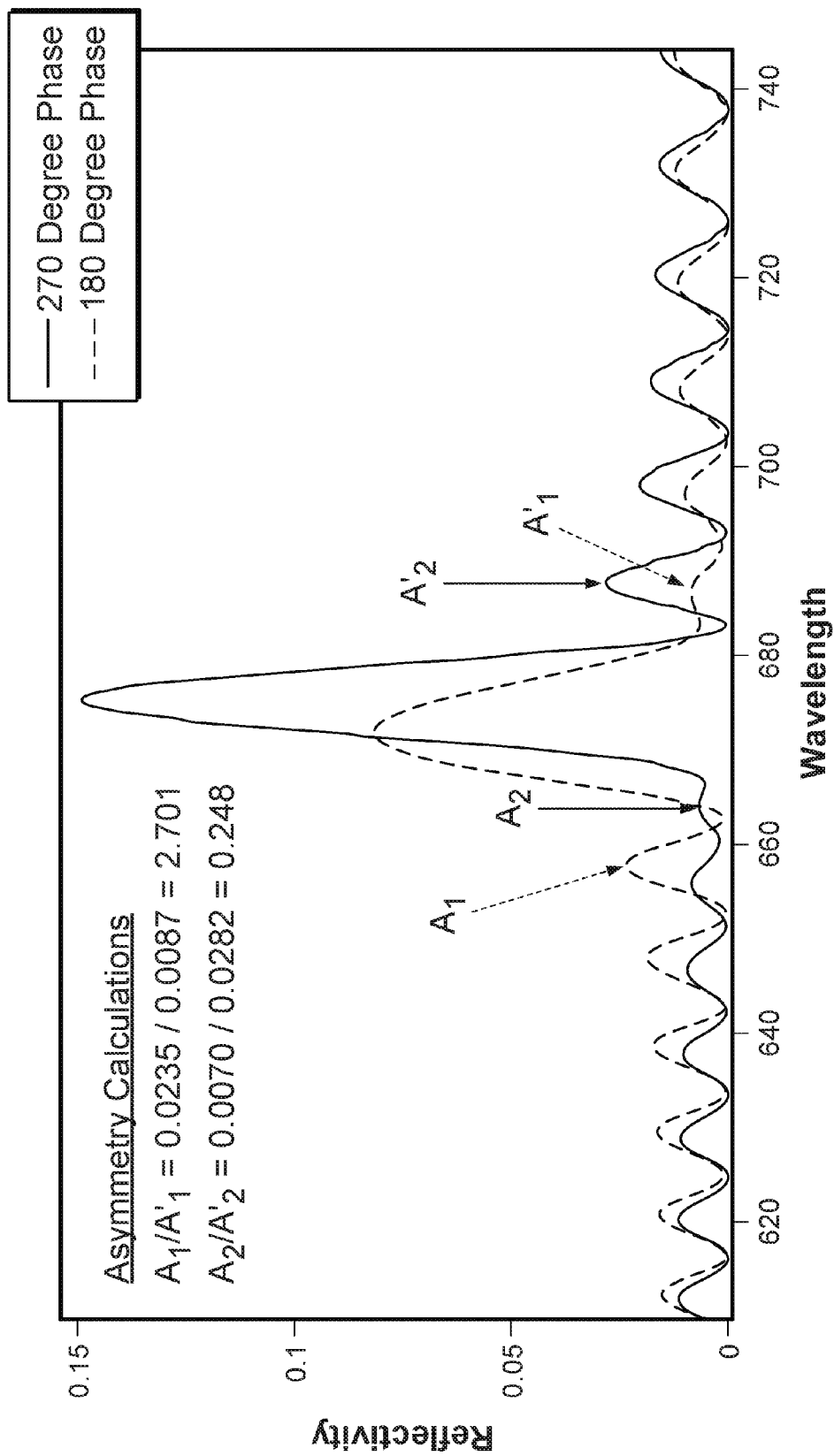
FIG. 15 is a graph illustrating an embodiment of side lobe asymmetry calculation for two rugate peaks differing only by phase.

FIG. 15 is a graph illustrating an embodiment of side lobe asymmetry calculation for two rugate peaks differing only by phase. In the example shown, spectra were calculated using standard optical transfer matrix methods applied to interference of multiple "layers". Note that in the case of rugate filters, physical "layers" are not discrete, rather they are smoothly and continuously varying. Inputs to the matrix were the two rugate index profiles shown in FIG. 14 for a tag thickness L of 15 μm. FIG. 15 shows the resultant rugate peaks that would be produced by each index profile to illustrate computation of sidelobe asymmetry. This method of extracting phase information is called the "sidelobe asymmetry method" and is explained in the next paragraph.

Sidelobe asymmetry is the quotient obtained by dividing the peak reflectance of the first sidelobe below a major reflectance peak of a rugate microtag by the peak reflectance of the first sidelobe above a major reflectance peak, shown in FIG. 15. The quotient varies smoothly over a range of values of the encoded rugate phase $\phi_i$. As such, the sidelobe asymmetry can be encoded into a rugate peak, and used to store information. Sidelobe asymmetry can be easily computed from the reflectance spectrum of a rugate microtag without the need for curve fitting, as described in the preceding paragraph. In addition, sidelobe asymmetry can be encoded by adjusting the rugate peak position while maintaining a fixed microtag optical thickness. This method is generally less preferred however, because it may interfere with direct peak position encoding.

The example illustrated FIGS. 14 and 15 requires precise knowledge of the relative position in wavelength between the rugate peak and the nearby surface-derived interference fringes, the quality of which is primarily dependent upon the quality of the spectrometer and signal processing used during interrogation and readout of a rugate particle. Depending on the nature of the manufacturing variability of the rugate filters, either simplified methods (such as using sidelobe asymmetry method described above) or more computationally intensive fitting methods can be used to extract $\phi_i$ or other basic parameters from the measured reflectance spectra of rugate filters. Additional examples of fitting methods include any form of non-linear regression analysis, such as the non-linear least squares method.

Phase encoding of information can utilize the number of different phase values $\phi_i$ determinable after consideration of manufacturing and reflectance measurement variations, as well as consideration of system decoding tolerances and error correction (ECC).

There exist various methods of mapping information bits (b) into physical media (known as "channel coding") that are well known in information theory and in such industries as the telecommunications, hard disk drive, flash memory, and optical data storage industries (e.g., algebraic codes for data transmission). Using the simple relation $2^b$=p that relates the number of values p required to provide b binary digits ("bits"), 4 distinct values of $\phi_i$, could provide 2 bits of raw information capacity, 8 values of $\phi_i$, could provide 3 bits of raw information capacity, and so on. Channel codes and ECC extract an overhead to provide for additional robustness and efficiency during the measurement and decoding process, such that information bits available to the end user should be distinguished from raw (or maximum theoretical) capacity available, as is well known in the field. Extraction of phase information, and associated encoded data, can be done for every determinable rugate peak in the reflectance spectrum of a tag to further increase information capacity. There are many ways to utilize phase, amplitude, and peak position to further increase information capacity, such as are used in typical digital communication systems.

There also exist many approaches to encoding that do not rely on precise determination of $\phi_i$, or other parameters, such as partial response maximum likelihood (PRML) codes and other methods that can deal with overlapping distributions of the various parameters. It will be obvious to those skilled in the art as to how to choose the appropriate channel codes and/or error correction code once the total system signal-to-noise ratio has been characterized, along with a thorough understanding of the physical variations encountered, including random and systematic noise sources.

The use of multiple frequencies, and the associated sidelobes, interference fringes, and their resultant interferences, means the phase-decoding aspects of the system are applicable to decoding all rugate microtags.

In some embodiments, the encoded information can be useful for means of labeling or authenticating various products or objects when the films, or pieces thereof, are attached to, or embedded within a product, object, or other item. In various embodiments, the encoded information is used to label or authenticate one or more of the following: a powder, a pill, a liquid drug, an art piece, a chip, a consumer device, an electronic device, or any other appropriate object that it is desired to label or authenticate. In some embodiments, information encoded in a microtag is used to determine whether or not an item is as desired. For example, an object is labeled using a microtag; the tag is read and the read tag is compared to a known tag signature associated with the object.

Applications for which phase tags (e.g., the rugate microtags) offer an improved method of encoding and decoding information, either using phase solely, or in combination with peak amplitude and/or position (wavelength) encoding, include: labeling, tracking, and/or authentication. In summary, a method and system of encoding, manufacturing, and decoding a rugate microtag, comprises:

determining a collection of waveform traits comprising phase values and optionally comprising traits selected from the group comprising frequency values and amplitude values;

coding information using the collection of traits;

assembling an acid-etching apparatus in which to acid-etch a silicon wafer using an etching current waveform;

mounting a silicon wafer in the apparatus;

generating an etching current waveform that contains the coded information:

acid-etching a silicon wafer using the waveform to create region of porous silicon in the silicon wafer;

lifting a film of porous silicon from the wafer using an electropolishing reaction;

breaking or cutting porous silicon film into rugate microtags;

oxidizing the porous silicon film to create a porous silica film;

applying rugate microtags to objects or embedding rugate microtags in objects;

measuring the reflectance spectrum of a rugate microtag associated with an object using an optical spectrometer;

detecting in the reflectance spectrum the peak reflectance of each rugate peak and of the sidelobes nearest each rugate peak in wavelength;

dividing the peak reflectance of the first sidelobe below a given rugate peak by the peak reflectance of the first sidelobe above the rugate peak to obtain a quotient;

converting the quotient to rugate phase;

repeating the preceding two steps for each rugate peak in the reflectance spectrum of the rugate microtag, thereby determining the rugate phase of each rugate peak in the etching current waveform used in the production of the rugate microtag;

if frequency traits were used to code the information, determining for each rugate peak in the reflectance spectrum the corresponding frequency used in the production of the rugate microtag;

if amplitude traits were used to code the information, determining for each rugate peak in the reflectance spectrum the peak amplitude used in the production of the rugate microtag;

determining the information coded in the rugate microtag based on the rugate phase values, and optionally based on values selected from the group comprising frequency values and amplitude values, recovered from the reflectance spectrum of the rugate microtag.

In some embodiments, the method and system storing information in the optical reflectance of the rugate microtag comprises:

producing a rugate microtag reflectance spectrum, either by electrochemical etching and measurement using an optical spectrometer or by calculation;

dividing the peak reflectance of the first sidelobe below a given rugate peak by the peak reflectance of the first sidelobe above the rugate peak to obtain a quotient;

repeating the preceding two steps using different values of the rugate phase until the quotient is a desired value;

assigning the final value of the quotient to a piece of information to be stored;

repeating the preceding four steps for each rugate peak in the reflectance spectrum of the rugate microtag, manufacturing rugate microtags with the desired sidelobe asymmetry corresponding to the information to be stored;

measuring the reflectance spectrum of a rugate microtag using an optical spectrometer;

detecting in the reflectance spectrum the peak reflectance of each rugate peak and of the sidelobes nearest each rugate peak in wavelength;

recalculating the quotient described in step two;

thereby determining the piece of information stored in the rugate microtag reflectance spectrum.

In some embodiments, the method of calculating the rugate phase of each sinusoidal component of an etching current waveform used in the production of a rugate microtag from analysis of the optical reflectance of the rugate microtag comprises:

measuring the reflectance spectrum of a rugate microtag using an optical spectrometer;

fitting the measured reflectance spectrum of each rugate peak to equation 4 using regression analysis;

solving equation 4 for the rugate phase of the rugate peak;

repeating the preceding two steps for each rugate peak in the reflectance spectrum of the rugate microtag, thereby determining the rugate phase of each sinusoidal component of the etching current waveform used in the production of the rugate microtag.

In some embodiments, the method of calculating the peak wavelength of each rugate component of an etching current waveform used in the production of a rugate microtag from analysis of the optical reflectance of the rugate microtag comprises:

measuring the reflectance spectrum of a rugate microtag using an optical spectrometer;

fitting the measured reflectance spectrum of each rugate peak to equation 4 using regression analysis;

solving equation 4 for the wavelength of each rugate peak;

repeating the preceding two steps for each rugate peak in the reflectance spectrum of the rugate microtag, thereby determining the peak wavelength of each rugate component of the etching current waveform used in the production of the rugate microtag.

In some embodiments, a reflectance spectrum is measured from a rugate microtag, and the amplitude, frequency (and/or scaled energy), and rugate phase of each sinusoidal component of the etching current are determined based on the measured rugate peaks. In some embodiments, the method of calculating the peak amplitude components of an etching current waveform used in the production of a rugate microtag from analysis of the optical reflectance of the rugate microtag comprises:

measuring the reflectance spectrum of a rugate microtag using an optical spectrometer;

fitting the measured reflectance spectrum of each rugate peak to equation 4 using regression analysis;

solving equation 4 for the amplitude of each rugate peak;

repeating the preceding two steps for each rugate peak in the reflectance spectrum of the rugate microtag, thereby determining the peak amplitude components of the etching current waveform used in the production of the rugate microtag.

In some embodiments, the method of decoding a rugate microtag, wherein the collection of traits for components of an etching current waveform used in the production of a rugate microtag are decoded using one of the preceding methods.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. An identifier, comprising:
   a silicon film;
      wherein the silicon film has a varying optical index of refraction;
      wherein the varying optical index of refraction reflects one or more spectral peaks when illuminated with light;
      wherein the one or more spectral peaks includes a reference peak; and
      wherein the silicon film is fragmented and then oxidized.

2. The identifier as in claim 1, wherein the identifier has an identifying data value associated with the one or more spectral peaks.

3. The identifier as in claim 2, wherein the identifying data value includes an error correction code data.

4. The identifier as in claim 2, wherein the identifying data value comprises a digital signature value.

5. The identifier as in claim 2, wherein the identifying data value includes a channel code data.

6. The identifier as in claim 1, wherein the identifier is added to an object for identification.

7. The identifier as in claim 1, wherein the identifier comprises a rugate microtag.

8. The identifier as in claim 7, wherein the varying optical index of refraction is generated using etching.

9. The identifier as in claim 8, wherein the etching comprises electrochemical etching.

10. The identifier as in claim 9, wherein the electrochemical etching creates small pores.

11. The identifier as in claim 1, wherein the varying optical index of refraction comprises a sine-wave refractive index profile.

12. The identifier as in claim 1, wherein the varying optical index of refraction comprises a plurality of composite sine-wave refractive index profiles.

13. The identifier as in claim 1, wherein the reference peak position is a highest energy peak.

14. The identifier as in claim 1, wherein the reference peak position is a lowest energy peak.

\* \* \* \* \*